(12) United States Patent
Jing et al.

(10) Patent No.: US 10,508,202 B2
(45) Date of Patent: Dec. 17, 2019

(54) NANOSILICA COATING FOR RETARDING DEW FORMATION

(71) Applicant: 3M INNOVATIVE PROPERTIES COMPANY, St. Paul, MN (US)

(72) Inventors: Naiyong Jing, Woodbury, MN (US); Christiane Strerath, Dusseldorf (DE); Michael R. Jost, Neuss (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 416 days.

(21) Appl. No.: 14/404,973

(22) PCT Filed: May 30, 2013

(86) PCT No.: PCT/US2013/043327
§ 371 (c)(1),
(2) Date: Dec. 2, 2014

(87) PCT Pub. No.: WO2013/188121
PCT Pub. Date: Dec. 19, 2013

(65) Prior Publication Data
US 2015/0191603 A1    Jul. 9, 2015

(30) Foreign Application Priority Data

Jun. 11, 2012  (EP) .................................... 12171540

(51) Int. Cl.
*C09D 1/00*      (2006.01)
*C08J 7/06*      (2006.01)
*C08K 3/36*      (2006.01)

(52) U.S. Cl.
CPC ................ *C09D 1/00* (2013.01); *C08J 7/06* (2013.01); *C08J 2333/12* (2013.01); *Y10T 428/259* (2015.01)

(58) Field of Classification Search
CPC . C09D 1/00; C08J 7/06; C08J 2333/12; C08J 7/065; C08K 3/36; Y10T 428/259
See application file for complete search history.

(56) References Cited

U.S. PATENT DOCUMENTS 6,586,502 B2   7/2003  Wallace
6,620,493 B2   9/2003  Hasegawa
7,189,768 B2   3/2007  Baran, Jr.
(Continued)

FOREIGN PATENT DOCUMENTS

JP    H11263950 A    9/1999
JP    2003049003     2/2003
(Continued)

OTHER PUBLICATIONS

Snowtex—Nissan Chemical, found at http://www.nissanchem-usa.com/products/snowtex/; Aug. 15, 2017.*
(Continued)

*Primary Examiner* — James M Mellott
(74) *Attorney, Agent, or Firm* — Carlos M. Téllez; 3M IPC (57) ABSTRACT

The present disclosure relates to silica nanoparticle coatings and articles, such as in particular retro-reflective devices, bearing silica nanoparticle coatings thereon. The present disclosure is also directed to a method for retarding dew formation on the surface of an article, in particular an article comprising a retro-reflective support.

13 Claims, 1 Drawing Sheet

(56) References Cited

U.S. PATENT DOCUMENTS

| | | | |
|---|---|---|---|
| 7,329,715 B2 | 2/2008 | Wang | |
| 7,781,525 B2 | 8/2010 | Yano | |
| 2004/0110077 A1* | 6/2004 | Yachi | C09C 1/3081 |
| | | | 430/108.6 |
| 2005/0233135 A1* | 10/2005 | Iyer | C03C 17/007 |
| | | | 428/331 |
| 2009/0169818 A1* | 7/2009 | Michel | C09D 5/1618 |
| | | | 428/148 |
| 2010/0035039 A1 | 2/2010 | Jing | |
| 2010/0178512 A1* | 7/2010 | Giesenberg | B29C 70/64 |
| | | | 428/405 |
| 2011/0263037 A1 | 10/2011 | Herz et al. | |

FOREIGN PATENT DOCUMENTS

| | | |
|---|---|---|
| JP | 2010144083 A | 7/2010 |
| WO | WO 2005-103172 | 11/2005 |
| WO | WO 2009-085680 | 7/2009 |
| WO | WO 2009-140482 | 11/2009 |
| WO | WO 2010-017069 | 2/2010 |
| WO | WO 2010-114700 | 10/2010 |
| WO | WO 2010114700 A1 * | 10/2010 ............. C08J 3/215 |
| WO | WO 2011-002838 | 1/2011 |
| WO | WO 2011/062880 | 5/2011 |
| WO | WO 2012-064646 | 5/2012 |

OTHER PUBLICATIONS

Horiba Instruments, Inc., "A guidebook to particle size analysis," 2010, XP002682130, 17 pages.

Webb, "Interpretation of Particle Size Reported by Different Analytical Techniques," Micromeritics Instrument Corp, 2009, XP002682131, pp. 1-10.

International Search Report for PCT International Application No. PCT/US2013/043327 dated Aug. 16, 2013, 4 pages.

* cited by examiner

NANOSILICA COATING FOR RETARDING DEW FORMATION

CROSS REFERENCE TO RELATED APPLICATIONS

This application is a national stage filing under 35 U.S.C. 371 of PCT/US2013/043327, filed May 30, 2013, which claims priority to European Application No. 12171540.3, filed Jun. 11, 2012, the disclosures of which are incorporated by reference in their entireties herein.

TECHNICAL FIELD

The present disclosure relates to silica nanoparticle coatings and articles, such as in particular retro-reflective devices, bearing silica nanoparticle coatings thereon. The present disclosure is also directed to a method for retarding dew formation on the surface of an article, in particular an article comprising a retro-reflective support.

BACKGROUND

Articles having surfaces capable of spreading water are desirable for a variety of uses. For example, transparent plastics used in misty or humid environments, such as windows of greenhouses, should avoid the formation of light-reflecting small water droplets which reduce light transmission. A water-spreading surface on these materials helps to maintain their transparency and minimizes undesirable streaking. Such water-spreading coatings, also referred to as anti-fogging coatings, are described e.g. in WO 2009/140482 (Jing et al.) and WO 2010/017069 (Jing et al.). The anti-fogging coatings disclosed in the above references in the context of transparent substrates, are claimed to resist the formation of small, condensed water droplets which would otherwise significantly reduce the transparency of the substrate. Other anti-fogging coating compositions are disclosed in WO 2009/085680 (Chen et al.) and WO 2011/002838 (Jing et al.), wherein the coating compositions comprising surface functionalized silica nanoparticles are described to be particularly useful on personal protection equipment such as face masks, shields and protective glasses.

Water-spreading characteristics are also desirable on articles used in outdoor applications, such as traffic signs that employ retro-reflective sheeting. Retro-reflective sheeting has the ability to return substantial quantities of incident light back towards the light source. Such light transmission into and back from a retro-reflective sheeting is impaired by clinging raindrops and in particular dew formation.

A prominent form of precipitation that affects light transmission or light reflection is dew formation. Dew can be particularly problematic because it occurs predominantly at nighttime when the retro-reflective sheeting is operative. When present on a traffic sign in the form of large beaded water droplets, dew can disrupt the path of incident and retro-reflective light. This can make information on the sign much more difficult for passing motorists to read. In some cases, accumulation of large water droplets on the surface of the retro-reflective traffic sign may result in complete loss of reflectivity or to a so-called "blackout" according to which the traffic sign becomes completely ineffective in displaying useful, if not vital, information to motorists or observers. In contrast, when the dew is spread out smoothly as a transparent layer over the surface of the retro-reflective traffic sign, the information on the sign is much easier to read because the resulting thin smooth layer of water does not significantly misdirect the path of incident and retro-reflective light to as great an extent.

The coatings disclosed in the art are not always satisfactory when it comes to prevent dew formation, especially on the surface of retro-reflective articles used in outdoor applications. Preventing or reducing dew formation, in particular in an outdoor environment, is more of a stringent requirement than providing anti-fogging, especially in terms of durability, UV-stability and/or abrasion resistance provided by the corresponding coating.

WO 2005/103172 (Iyer et al.) discloses a so-called dew-resistant coating, wherein the described dew-resistant coating comprises elongate silica particles having an aspect ratio greater than 1. Other alternative ways of preventing dew formation on substrates are described in the background section of this patent application.

Without contesting the technical advantages associated with the anti-fogging and dew resistant coatings disclosed in the art, there is still a need for a method of retarding dew formation on the surface of an article comprising a retro-reflective support, and for coated articles and coatings having improved performance with regard to dew formation retarding, durability, UV-stability and/or abrasion resistance, in particular when applied on the surface of retro-reflective articles used in outdoor applications.

Other advantages of the coatings, coated articles and methods of the disclosure will be apparent from the following description.

SUMMARY

According to one aspect, the present disclosure relates to a method for retarding dew formation on the surface of an article comprising a retro-reflective support, the method comprising the steps of:
  a) providing a substrate;
  b) contacting at least part of the surface of the substrate with a silica nanoparticle coating composition comprising:
    i. an aqueous dispersion of a mixture of silica nanoparticles having an average particle diameter of 40 nanometers or less and silica nanoparticles having an average particle diameter greater than 40 nanometers, the aqueous dispersion having a pH of less than 5, and
    ii. an acid having a pKa of less than 5;
  c) drying the coating composition so as to provide a silica nanoparticle coating onto the substrate, and thereby forming a coating assembly; and
  d) applying the coating assembly onto at least part of the retro-reflective support.

According to another aspect, the present disclosure relates to a method for retarding dew formation on the surface of an article comprising a retro-reflective support, the method comprising the steps of:
  a) providing a substrate;
  b) contacting at least part of the surface of the substrate with a silica nanoparticle coating composition comprising:
    i. an aqueous dispersion of a mixture of acicular silica nanoparticles and spherical silica nanoparticles, the aqueous dispersion having a pH of less than 5, and
    ii. an acid having a pKa of less than 5;
  c) drying the coating composition so as to provide a silica nanoparticle coating onto the substrate, and thereby forming a coating assembly; and d) applying the coating assembly onto at least part of the retro-reflective support.

According to still another aspect, the present disclosure relates to a method for retarding dew formation on the surface of an article comprising a retro-reflective support, the method comprising the steps of:
a) providing a substrate;
b) contacting at least part of the surface of said substrate with a silica nanoparticle coating composition comprising:
  i. an aqueous dispersion of core-shell particles, each core-shell particle comprising a polymer core surrounded by a shell consisting essentially of silica nanoparticles disposed on the polymer core, the aqueous dispersion having a pH of less than 5, and
  ii. an acid having a pKa of less than 5;
c) drying the coating composition so as to provide a silica nanoparticle coating onto the substrate, and thereby forming a coating assembly; and
d) applying the coating assembly onto at least part of the retro-reflective support.

In another aspect, the present disclosure is directed to a coating assembly comprising a substrate and a silica nanoparticle coating thereon, wherein the silica nanoparticle coating is obtainable by any of the methods described above, and wherein the substrate comprises a material selected from the group consisting of poly(meth)acrylates, and any combinations or mixtures thereof.

According to still another aspect of the present disclosure, it is provided a coated article comprising a support and a coating assembly as described above thereon.

In yet another aspect, the present disclosure is directed to the use of a silica nanoparticle coating or a coating assembly as described above for retarding dew formation on the surface of an article comprising a retro-reflective support.

DETAILED DESCRIPTION

According to one aspect, the present disclosure relates to a method for retarding dew formation on the surface of an article comprising a retro-reflective support (and intended for outdoor usage), the method comprising the steps of:
a) providing a substrate;
b) contacting at least part of the surface of the substrate with a silica nanoparticle coating composition comprising:
  i. an aqueous dispersion of a mixture of silica nanoparticles having an average particle diameter of 40 nanometers or less and silica nanoparticles having an average particle diameter greater than 40 nanometers, the aqueous dispersion having a pH of less than 5, and
  ii. an acid having a pKa of less than 5;
c) drying the coating composition so as to provide a (sintered) silica nanoparticle coating onto the substrate, and thereby forming a coating assembly; and
d) applying the coating assembly onto at least part of the retro-reflective support.

Suitable silica nanoparticle coating compositions and methods of manufacturing thereof, for use in this execution of the method for retarding dew formation on the surface of a substrate according to the disclosure, are fully described in WO 2009/140482 (Jing et al.), the content of which is incorporated herein by reference. Preferably, the silica nanoparticles having an average particle diameter greater than 40 nanometers for use herein have an average particle diameter of 200 nanometers or less, more preferably of 180 nanometers or less, even more preferably of 150 nanometers or less.

In the context of the present disclosure, the average particle diameter of the silica nanoparticles for use herein, is determined using Field Emission Scanning Electron Microscopy (FE-SEM) techniques, well known to those skilled in the art.

In a preferred aspect, the silica nanoparticle coating composition for use in this execution of the method of the present disclosure, comprises:
a) an aqueous dispersion of a mixture of:
  i. silica nanoparticles having an average particle diameter of 30 nanometers or less, preferably 20 nanometers or less, more preferably 10 nanometers or less, even more preferably 5 nanometers or less; still more preferably 4 nanometers or less; and
  ii. silica nanoparticles having an average particle diameter greater than 40 nanometers, preferably greater than 60 nanometers, more preferably greater than 80 nanometers, even more preferably greater than 100 nanometers;
  the aqueous dispersion having a pH of less than 5, preferably less than 4, more preferably less than 3; and
b) an acid having a pKa of less than 5, preferably less than 3, more preferably less than 2, even more preferably less than 0.

Preferably, the silica nanoparticles having an average particle diameter greater than 40 nanometers for use herein have an average particle diameter of 200 nanometers or less, more preferably of 180 nanometers or less, even more preferably of 150 nanometers or less.

According to another aspect, the present disclosure relates to a method for retarding dew formation on the surface of an article comprising a retro-reflective support (and intended for outdoor usage), the method comprising the steps of:
a) providing a substrate;
b) contacting at least part of the surface of the substrate with a silica nanoparticle coating composition comprising:
  i. an aqueous dispersion of a mixture of acicular silica nanoparticles and spherical silica nanoparticles, the aqueous dispersion having a pH of less than 5, and
  ii. an acid having a pKa of less than 5;
c) drying the coating composition so as to provide a (sintered) silica nanoparticle coating onto the substrate, and thereby forming a coating assembly; and
d) applying the coating assembly onto at least part of the retro-reflective support.

Suitable silica nanoparticle coating compositions and methods of manufacturing thereof, for use in this execution of the method for retarding dew formation on the surface of a substrate according to the disclosure, are fully described in WO 2010/017069 (Jing et al.), the content of which is incorporated herein by reference.

In a preferred aspect, the silica nanoparticle coating composition for use in this execution of the method of the present disclosure, comprises:
a) an aqueous dispersion of a mixture of:
  i. acicular silica nanoparticles having an average particle diameter comprised between 5 and 30 nanometers, preferably between 7 and 25 nanometers, more preferably between 8 and 20 nanometers, even more preferably between 9 and 15 nanometers, and having an average length comprised between 20 and 300 nanometers, preferably between 30 and 200 nanometers, more preferably between 35 and 150 nanometers, even more preferably between 40 and 100 nanometers; and
ii. spherical silica nanoparticles having an average particle diameter of 30 nanometers or less, preferably 20 nanometers or less, more preferably 10 nanometers or less, even more preferably 5 nanometers or less;
the aqueous dispersion having a pH of less than 5, preferably less than 4, more preferably less than 3; and
b) an acid having a pKa of less than 5, preferably less than 3, more preferably less than 2, even more preferably less than 0.

According to still another aspect, the present disclosure relates to a method for retarding dew formation on the surface of an article comprising a retro-reflective support (and intended for outdoor usage), the method comprising the steps of:
a) providing a substrate;
b) contacting at least part of the surface of said substrate with a silica nanoparticle coating composition comprising:
i. an aqueous dispersion of core-shell particles, each core-shell particle comprising a polymer core surrounded by a shell consisting essentially of silica nanoparticles, preferably of nonporous silica nanoparticles, disposed on the polymer core, the aqueous dispersion having a pH of less than 5, and
ii. an acid having a pKa of less than 5;
c) drying the coating composition so as to provide a (sintered) silica nanoparticle coating onto the substrate, and thereby forming a coating assembly; and
d) applying the coating assembly onto at least part of the retro-reflective support.

Suitable silica nanoparticle coating compositions and methods of manufacturing thereof, for use in this execution of the method for retarding dew formation on the surface of a substrate according to the disclosure, are fully described in WO 2010/114700 (Jing et al.), the content of which is incorporated herein by reference.

Preferably, the polymer core of the core-shell particles for use in this execution of the method of the present disclosure, comprises a polymer selected from the group consisting of acrylic polymers, polyurethane polymers, polyolefin polymers including functionalized polyolefins, polystyrene polymers, and any combinations or mixtures thereof.

More preferably, the polymer core of the core-shell particles for use in this execution of the method of the present disclosure, comprises a polymer selected from the group consisting of acrylic polymers, polyurethane polymers, and any combinations or mixtures thereof.

In one preferred aspect, the silica nanoparticle coating composition for use in this execution of the method of the present disclosure, comprises:
a) an aqueous dispersion of a mixture of:
i. acicular silica nanoparticles having an average particle diameter comprised between 5 and 30 nanometers, preferably between 7 and 25 nanometers, more preferably between 8 and 20 nanometers, even more preferably between 9 and 15 nanometers, and having an average length comprised between 20 and 300 nanometers, preferably between 30 and 200 nanometers, more preferably between 35 and 150 nanometers, even more preferably between 40 and 100 nanometers;
ii. polymer (latex) particles comprising acrylic polymers and/or polyurethane polymers; and
iii. spherical silica nanoparticles having an average particle diameter of 30 nanometers or less, preferably 20 nanometers or less, more preferably 10 nanometers or less, even more preferably 5 nanometers or less;
the aqueous dispersion having a pH of less than 5, preferably less than 4, more preferably less than 3; and
b) an acid having a pKa of less than 5, preferably less than 3, more preferably less than 2, even more preferably less than 0.

In another preferred aspect, the silica nanoparticle coating composition for use in this execution of the method of the present disclosure, comprises:
a) an aqueous dispersion of a mixture of:
i. spherical silica nanoparticles having an average particle diameter of 30 nanometers or less, preferably 20 nanometers or less, more preferably 10 nanometers or less, even more preferably 5 nanometers or less;
ii. polymer (latex) particles comprising polyurethane polymers and/or acrylic polymers; and
iii. spherical silica nanoparticles having an average particle diameter greater than 40 nanometers, preferably greater than 50 nanometers, more preferably greater than 60 nanometers, even more preferably greater than 70 nanometers;
the aqueous dispersion having a pH of less than 5, preferably less than 4, more preferably less than 3; and
b) an acid having a pKa of less than 5, preferably less than 3, more preferably less than 2, even more preferably less than 0.

In still another preferred aspect, the silica nanoparticle coating composition for use in this execution of the method of the present disclosure, comprises:
a) an aqueous dispersion of a mixture of:
i. spherical silica nanoparticles having an average particle diameter of 30 nanometers or less, preferably 20 nanometers or less, more preferably 10 nanometers or less, even more preferably 5 nanometers or less; and
ii. polymer (latex) particles comprising polyurethane polymers and/or acrylic polymers; and
the aqueous dispersion having a pH of less than 5, preferably less than 4, more preferably less than 3; and
b) an acid having a pKa of less than 5, preferably less than 3, more preferably less than 2, even more preferably less than 0.

In yet another preferred aspect, the silica nanoparticle coating composition for use in this execution of the method of the present disclosure, comprises:
a) an aqueous dispersion of a mixture of:
i. acicular silica nanoparticles having an average particle diameter comprised between 5 and 30 nanometers, preferably between 7 and 25 nanometers, more preferably between 8 and 20 nanometers, even more preferably between 9 and 15 nanometers, and having an average length comprised between 20 and 300 nanometers, preferably between 30 and 200 nanometers, more preferably between 35 and 150 nanometers, even more preferably between 40 and 100 nanometers; and
ii. polymer particles comprising polyurethane polymers and/or acrylic polymers; and the aqueous dispersion having a pH of less than 5, preferably less than 4, more preferably less than 3; and b) an acid having a pKa of less than 5, preferably less than 3, more preferably less than 2, even more preferably less than 0.

In the context of the present disclosure, it has been surprisingly discovered that the (acidified) silica nanoparticle coating layers as described above provide unexpected dew formation retarding capabilities when applied onto various substrates. Without wishing to be bound by theory, it is believed that this is due to the continuous and inorganic nature of the silica nanoparticle coating provided upon the coated substrate, and in particular to the involvement of continuous sinter-bonded silica nanoparticles or continuous inorganic network of silica nanoparticles agglomerates. Still without wishing to be bound by theory, it is believed that the porosity characteristics of the silica nanoparticle coating layers as described above increase the so-called capillary effect, which in turn participates in promptly spreading water droplets (including dew water droplets) into a sheet-like configuration.

The silica nanoparticle coating layers as described above provide excellent dew formation retarding capabilities when applied onto various substrates, in particular to substrates comprising a material selected from the group consisting of polymeric materials such as e.g. polymeric films and sheet materials, glass, ceramic, organic and inorganic composite material, metal, and any combinations thereof.

Substrates to which the coating compositions of the disclosure can be applied are preferably transparent or translucent to visible light. In some aspects, substrates are made of polyester (e.g., polyethylene terephthalate, polybutyleneterephthalate), polycarbonate, allyldiglycolcarbonate, poly(meth)acrylates, such as polymethylmethacrylate, polystyrene, polysulfone, polyethersulfone, epoxy homopolymers, epoxy addition polymers with polydiamines, polydithiols, polyethylene copolymers, fluorinated surfaces, cellulose esters such as acetate and butyrate, including blends and laminates thereof.

Typically, the substrate is in the form of a film, sheet, panel or pane of material and may be a part of an article such as of traffic signs, retroreflective and graphic signage, informative and advertising panels, license plates for automotive vehicles, raised pavement markers, reflectors and linear delineation systems (LDS), advertisement light boxes, platforms or display supports bearing visually observable information, architectural glazing, decorative glass frames, motor vehicle windows and windshields, protective eye wear, and any combinations thereof. The silica nanoparticle coatings may, optionally if desired, cover only a portion of the article, e.g., only the section comprising visually observable information may be coated. The substrate may be flat, curved or shaped.

In other embodiments, the substrate need not be transparent. This particular execution applies e.g. to substrates such as flexible films used in graphics and signage. Flexible films may be made from polyesters such as PET (polyethylene terephthalate) or polyolefins such as PP (polypropylene), PE (polyethylene) and PVC (polyvinyl chloride) are typically preferred. The substrate can be formed into a film using conventional filmmaking techniques such as extrusion of the substrate resin into a film and optional uniaxial or biaxial orientation of the extruded film. The substrate can be treated to improve adhesion between the substrate and the silica nanoparticle coating layers as described above, using, e.g., chemical treatment, corona treatment such as air or nitrogen corona, plasma, flame, flash lamp treatment or actinic radiation. If desired, an optional tie layer can also be applied between the substrate and the coating composition to increase the interlayer adhesion. The other side of the substrate may also be treated using the above-described treatments to improve adhesion between the substrate and an adhesive. The substrate may be provided with graphics, such as words or symbols as known in the art.

Preferably, the substrate for use herein comprises an organic polymeric material, preferably selected from the group consisting of poly(meth)acrylates, polyurethanes, polyesters, polycarbonates, polyolefins, and any combinations or mixtures thereof. In another preferred aspect, the substrate for use herein comprises organic functional polymers selected from copolymers of functional and non-functional organic polymers.

In a more preferred aspect, the substrate for use herein comprises poly(meth)acrylates, and any combinations or mixtures thereof. More preferably, the substrate comprises polymethylmethacrylate, even more preferably impact modified polymethylmethacrylate. According to still a more preferred aspect, the substrate consists essentially of polymethylmethacrylate.

The silica nanoparticle coating layers for use in the method of the present disclosure are substantially uniform in thickness and are durably adhered to the substrate. The silica coatings for use herein may further provide a hydrophilic surface to the substrate and is particularly useful in providing a hydrophilic surface to hydrophobic polymer substrates. The silica coatings for use herein may also provide antifogging properties. The silica coatings for use herein may also preferably provide dry and wet abrasion resistance and slip properties to the coated substrates, in particular polymeric materials, such as film and sheet materials, thereby improving their handleability.

Coatings that result from the silica nanoparticle compositions as described above may further provide a water-resistant and mechanically durable hydrophilic surface to a substrate, such as glass and polymeric substrates, and good anti-fogging properties under a variety of temperature and high humidity conditions. Furthermore, the silica coatings for use herein may further provide protective layers and exhibit rinse-away removal of organic contaminates including food and machine oils, paints, dust and dirt, as the nanoporous structure of the coatings tends to prevent penetration by oligomeric and polymeric molecules.

Advantageously, the silica nanoparticle coatings for use herein may further provide excellent scratch resistance, as well as long lasting protection from soil and stain accumulation, in particular from staining minerals and soap deposits. Other advantages include more uniform coatings, better adhesion to substrates, better durability and increased UV stability of the coating, increased transmissivity, and easy-to-clean benefit where contaminant may be rinsed away from the coated surface. Advantageously still, the silica nanoparticle coating compositions for use herein are shelf stable, e.g., they do not gel, opacify, or otherwise deteriorate significantly.

The methods of the disclosure do not require solvent or surfactants for coating on substrates, and therefore are less hazardous and add no volatile organic compounds (VOCs) to the air. Unexpectedly, the silica nanoparticle coating compositions, when acidified, could be coated directly onto hydrophobic organic and inorganic substrates without either organic solvents or surfactants. The wetting property of these inorganic nanoparticle aqueous dispersions on hydrophobic surfaces, such as polyethylene terephthalate (PET), polycarbonate (PC) or polyacrylates (e.g. PMMA), is a function of the pH of the dispersions and the pKa of the acid. In contrast, the coating compositions bead up on the organic substrates at neutral or basic pH.

Without wishing to be bound by theory, it is believed that the chemical bonds between silica nanoparticles are formed by through acid-catalyzed siloxane bonding in combination with protonated silanol groups at the nanoparticle surfaces and these acid catalyzed sinter-bonded silica nanoparticles are believed to explain the coatability on hydrophobic organic surfaces, as these groups tend to be bonded, adsorbed, or otherwise durably attached to hydrophobic surfaces.

Although aqueous organic solvent based coatings of nanoparticle silica dispersions have been described, such mixtures of water and an organic solvents typically suffer from differential evaporation rates that result in continuously changing composition of the liquid phase, which consequently changes the coating properties; resulting in poor uniformity and defects. Organic solvent may also cause the silica nanoparticle dispersions to be instable. Although surfactants may help the wetting property of dispersions, they interfere with interparticle and interfacial substrate adhesion, and often produce non-uniform and defect-containing coatings.

Light-scattering measurements on these acidified dispersion solutions indicate that these silica nanoparticles do tend to agglomerate, providing (after coating and drying) three-dimensional porous networks of silica nanoparticles where each nanoparticle appears to be firmly bonded to adjacent nanoparticles. Micrographs reveal such bonds as silica "necks" between adjacent particles which are created by the acid in the absence of silica sources such as tetraalkoxysilanes. Their formation is attributed to the catalytic action of strong acid in making and breaking siloxane bonds. Surprisingly, the acidified dispersions appear to be stable when the pH is of less than 5, in particular in the range 2 to 4 at the isoelectric point of silica nanoparticles.

In the context of the present disclosure, the expression "sintered silica nanoparticle coating" or "silica nanoparticle coating comprising sintered silica nanoparticles", is meant to designate a silica nanoparticle coating layer obtained from a coating composition comprising acidified silica nanoparticles, after said coating composition comprising acidified silica nanoparticles has been subjected to an appropriate drying step.

In the context of the present disclosure, the expressions "sintered silica nanoparticles", "acid-sintered silica nanoparticles", "acid catalyzed sinter-bonded silica nanoparticles" or "sinter-bonded silica nanoparticles" may be used interchangeably.

Without wishing to be bound by theory, it is believed that the silica nanoparticle coating comprising sintered silica nanoparticles, as described herein, comprises an aggregate or agglomeration of silica nanoparticles linked together so as to form a porous three-dimensional network. The term "porous" refers to the presence of voids between the silica nanoparticles created when the particles form a continuous coating.

The silica nanoparticles for use herein are preferably dispersions of submicron size silica nanoparticles in an aqueous or in a water/organic solvent mixture. The average particle size may alternatively be determined using transmission electron microscopy techniques, well known to those skilled in the art. The silica nanoparticles are preferably not surface modified.

The nanoparticles for use herein generally have a specific surface area greater than about 50 m$^2$/gram, preferably greater than 200 m$^2$/gram, and more preferably greater than 400 m$^2$/gram. The particles preferably have narrow particle size distributions, that is, a polydispersity of 2.0 or less, preferably 1.5 or less. If desired, larger silica particles may be added, in amounts that do not deleteriously decrease the coatability of the composition on a selected substrate, and do not reduce the transmissivity and/or the hydrophilicity, and/or do not increase the haze.

Suitable inorganic silica sols of porous and nonporous spherical particles in aqueous media are well known in the art and available commercially. Silica sols in water or water-alcohol solutions are available commercially under such trade names as LUDOX (manufactured by E.I. du Pont de Nemours and Co., Inc., Wilmington, Del., USA), NYACOL (available from Nyacol Co., Ashland, Mass.) or NALCO (manufactured by Ondea Nalco Chemical Co., Oak Brook, Ill. USA). One useful silica sol is NALCO 2326 available as a silica sol with mean particle size of 5 nanometers, pH 10.5, and solid content 15% by weight. Other commercially available silica nanoparticles for use herein include NALCO 1050, NALCO 1115, NALCO 1130, NALCO 2329, NALCO 8699 and NALCO TX11561, commercially available from NALCO Chemical Co.; REMASOL SP30, commercially available from Remet Corp. of Utica, N.Y.; LUDOX SM, commercially available from E. I. du Pont de Nemours Co., Inc.; LI-518 and SI-5540, commercially available from Silco company. Other commercially available silica sols in water dispersion are available commercially under such trade names as Levasil or Bindzil (manufactured by Akzo Nobel). Some useful silica sols are Levasil 500/15, Levasil 50/50, Levasil 100/45, Levasil 200/30, Bindzil 15/500, Bindzil 15/750 and Bindzil 50/80.

Suitable acicular silica particles may be obtained as an aqueous suspension under the trade name SNOWTEX-UP or SNOWTEX-OUP by Nissan Chemical Industries (Tokyo, Japan). The SNOWTEX-UP mixture consists of 20-21% (w/w) of acicular silica, less than 0.35% (w/w) of Na$_2$O, and water. The particles are about 9 to 15 nanometers in diameter and have lengths of 40 to 300 nanometers. The suspension has a viscosity of <100 mPas at 25° C., a pH of about 9 to 10.5, and a specific gravity of about 1.13 at 20° C. As for the SNOWTEX-OUP mixture, it consists of a 15-16% (w/w) of acicular silica, with a pH of about 2 to 4.

Other suitable acicular silica particles may be obtained as an aqueous suspension under the trade name SNOWTEX-PS-S and SNOWTEX-PS-M by Nissan Chemical Industries, having a morphology of a string of pearls. The mixture consists of 20-21% (w/w) of silica, less than 0.2% (w/w) of Na$_2$O, and water. The SNOWTEX-PS-M particles are about 18 to 25 nanometers in diameter and have lengths of 80 to 150 nanometers. The particle size is 80 to 150 by dynamic light scattering methods. The suspension has a viscosity of <100 mPas at 25° C., a pH of about 9 to 10.5, and a specific gravity of about 1.13 at 20° C. The SNOWTEX-PS-S has a particle diameter of 10-15 nm and a length of 80-120 nm.

Examples of commercially available polymer latexes suitable for use herein include those aqueous aliphatic polyurethane emulsions available as NEOREZ R-960, NEOREZ R-966, NEOREZ R-967, NEOREZ R-9036, and NEOREZ R-9699 from DSM NeoResins, Inc. of Wilmington, Mass.; aqueous anionic polyurethane dispersions available as ESSENTIAL CC4520, ESSENTIAL CC4560, ESSENTIAL R4100, and ESSENTIAL R4188 from Essential Industries, Inc. of Merton, Wis.; polyester polyurethane dispersions available as SANCURE 843, SANCURE 898, and SANCURE 12929 from Lubrizol, Inc. of Cleveland, Ohio; an aqueous aliphatic self-crosslinking polyurethane dispersion available as TURBOSET 2025 from Lubrizol, Inc.; and an aqueous anionic, co-solvent free, aliphatic self-crosslinking polyurethane dispersion, available as BAYHYDROL PR240 from Bayer Material Science, LLC of Pittsburgh, Pa. Other commercially available polymer latexes suitable for use herein include those aqueous acrylic emulsions available as NEOCRYL A-612, NEOCRYL XK-151 and NEOCRYL XK-52 from DSM NeoResins, Inc. of Wilmington, Mass.

Low- or non-aqueous silica sols (also called silica organosols) may also be used and are silica sol dispersions wherein the liquid phase is an organic solvent, or an aqueous organic solvent. In the practice of this disclosure, the silica sol is chosen so that its liquid phase is compatible with the emulsion, and is typically aqueous or an aqueous organic solvent.

The silica nanoparticle coating compositions for use herein preferably contain an acid having a pKa ($H_2O$) of less than 5, preferably less than 4, more preferably less than 3.5, even more preferably less than 3, even more preferably less than 2.5, even more preferably less than 2, even more preferably less than 1.5, even more preferably less than 1, most preferably less than 0. Useful acids for use herein include both organic and inorganic acids and may be exemplified by oxalic acid, citric acid, $H_2SO_3$, $H_3PO_4$, $CF_3CO_2H$, HCl, HBr, HI, $HBrO_3$, $HNO_3$, $HClO_4$, $H_2SO_4$, $CF_3SO_3H$, $CF_3CO_2H$, and $CH_3SO_2OH$. Most preferred acids include HCl, $HNO_3$, $H_2SO_4$, and $H_3PO_4$. In some embodiments, it is desirable to provide a mixture of an organic and inorganic acid. In some embodiments one may use a mixture of acids comprising those having a pKa of 3.5 or less (preferably less than 2.5, most preferably less than 1) and minor amounts of other acids having pKa's of more than 0. The coating compositions generally contain sufficient acid to provide a pH of less than 5, preferably less than 4, most preferably less than 3.

Tetraalkoxysilane coupling agents, such as tetraethylorthosilicate (TEOS) and oligomeric forms, such as alkyl polysilicates (e.g. poly(diethoxysiloxane)), may also be useful to improve binding between silica nanoparticles. The amount of coupling agent included in the coating composition should be limited in order to prevent destruction of the anti-reflective or anti-dew properties of the coating. The optimal amount of coupling agent is determined experimentally and is dependent on the coupling agent's identity, molecular weight and refractive index. The coupling agent(s), when present, are typically added to the composition at levels of 0.1 to 20 percent by weight of the silica nanoparticle concentration, and more preferably about 1 to 15 percent by weight of the silica nanoparticles.

In one preferred aspect, the method of the present disclosure further comprises the step of applying a primer coating composition to the surface of the substrate prior to the step of contacting the surface of the substrate with the silica nanoparticle coating composition. Suitable primer coating compositions for use in the context of the present disclosure are those capable of improving the adhesion of the silica nanoparticle coating layer to the surface of the substrate onto which is applied the silica nanoparticle coating. Accordingly, suitable primer coating compositions for use herein are those capable of enhancing the durability, the UV stability and/or the abrasion resistance of the silica nanoparticle coating applied onto the surface of the substrate. In the context of the present disclosure, the expression "abrasion resistance" is meant to designate dry and/or wet abrasion resistance, as measured according to the dry or wet abrasion test method described in the experimental section.

The term "durability" is herein meant to refer to the durability as evaluated according to the durability test method described in the experimental section.

In the context of the present disclosure, it has been surprisingly found that finding suitable primer coating compositions for use in combination with the silica nanoparticle coating layers as described above was not as obvious as expected, in particular when the coated substrate is intended to provide both dry and wet abrasion resistance.

Suitable primer coating compositions for use herein preferably comprise an organofunctional silane. In the context of the present disclosure, the expression "organofunctional silane" is meant to refer to a silane that comprises at least one organic ligand that possesses reactive chemical functionality. Suitable organofunctional silanes for use herein may commonly be referred to as silane coupling agents or silane adhesion promoters by those skilled in the art.

Suitable organofunctional silanes for use herein may preferably have the following chemical formula:

$(R^1O)_m$—Si—$[(CH_2)_n$—Y$]_{4-m}$ wherein:
$R^1$ is independently an alkyl, preferably comprising 1 to 6, more preferably 1 to 4 carbon atoms, even more preferably $R^1$ is independently selected from the group consisting of methyl, ethyl, propyl, butyl and acetyl, still more preferably from the group consisting of methyl and ethyl;
m=1 to 3, preferably m=2 or 3;
n=0 to 12, preferably n=0 to 3, more preferably n=2 or 3;
Y is a functional group, preferably independently selected from the group consisting of alkoxy, epoxycyclohexyl, glycidyl, glycidyloxy, halogen, (meth)acryloyl, (meth)acryloyloxy, —NH—$CH_2$—$CH_2$—$NR^2R^3$, —$NR^2R^3$ (with $R^2$ and $R^3$ being independently selected from the group consisting of H, alkyl, phenyl, benzyl, cyclopentyl and cyclohexyl).

Suitable organofunctional silanes for use herein are preferably selected from the group consisting of epoxy silanes, amino silanes, silanes comprising at least one ethylenically unsaturated group (also referred to herewith as ethylenically unsaturated silanes), alkoxy silanes, and any combinations or mixtures thereof. Preferably, the ethylenically unsaturated group is an acrylic group or a vinyl group. More preferably, the ethylenically unsaturated group is an acrylic group. Even more preferably, the ethylenically unsaturated group is a (meth)acryloyloxy group.

Preferably, the organofunctional silanes for use herein are selected from the group consisting of epoxy silanes, amino silanes, (meth)acryloyloxy silanes, alkoxy silanes, and any combinations or mixtures thereof.

Suitable primer coating compositions for use herein may comprise the so-called thermally activated primer coating compositions or the so-called photochemically activated primer coating compositions. In the context of the present disclosure, thermally activated primer coating compositions are particularly preferred.

Suitable thermally activated primer coating compositions for use herein preferably comprise an organofunctional silane which is preferably selected from the group consisting of epoxy silanes, amino silanes, alkoxy silanes, and any combinations or mixtures thereof. Suitable photochemically activated primer coating compositions for use herein preferably comprise an organofunctional silane which is preferably selected from the group consisting of ethylenically unsaturated silanes, more preferably (meth)acryloyloxy silanes, and any combinations or mixtures thereof.

Suitable epoxy silanes for use herein include, but are not limited to, 2-(3,4-epoxycyclohexyl)ethyltrimethoxysilane, 2-(3,4-epoxycyclohexyl)ethyltriethoxysilane, (3-glycidoxypropyl)trimethoxysilane, (3-glycidoxypropyl)triethoxysilane, and any combinations or mixtures thereof. More preferably, the epoxy silane comprises 2-(3,4-epoxycyclohexyl)ethyltrimethoxysilane.

Suitable amino silanes for use herein include, but are not limited to, 3-aminopropyltrimethoxysilane, 3-aminopropyltriethoxysilane, 3-(2-aminoethylamino) propyltrimethoxysilane, 3-(2-aminoethylamino) propyltriethoxysilane, N-(2-aminoethyl)-3-aminopropylmethyldimethoxysilane, N-(2-aminoethyl)-3-aminopropylmethyldiethoxysilane, 4-aminobutyltrimethoxysilane, 4-aminobutyltriethoxysilane, 3-aminopropylmethyldiethoxysilane, 3-aminopropylmethyldimethoxysilane, 3-aminopropyldimethylmethoxysilane, 3-aminopropyldimethylethoxysilane, and any combinations or mixtures thereof. More preferably, the amino silane for use herein comprises 3-aminopropyltrimethoxysilane.

Suitable ethylenically unsaturated silanes, in particular (meth)acryloyloxy silanes, for use herein include, but are not limited to, 3-(acryloyloxy) propyl trimethoxysilane, 3-(acryloyloxy) propyl triethoxysilane, 3-(methacryloyloxy) propyl trimethoxysilane, 3-(methacryloyloxy) propyl triethoxysilane, and any combinations or mixtures thereof. More preferably, the (meth)acryloyloxy silane for use herein comprises 3-(acryloyloxy)propyl trimethoxysilane, 3-(methacryloyloxy) propyl trimethoxysilane, or any combinations or mixtures thereof.

Suitable alkoxy silanes for use herein include, but are not limited to, tetra-, tri- or dialkoxy silanes, and any combinations or mixtures thereof. Preferably, the alkyl group(s) of the alkoxy silanes comprises from 1 to 6, more preferably 1 to 4 carbon atoms. Preferred alkoxysilanes for use herein are selected from the group consisting of tetra methoxysilane, tetra ethoxysilane, methyl triethoxysilane, dimethyldiethoxysilane, and any mixtures thereof. A particularly preferred alkoxysilane for use herein comprises tetraethoxysilane.

According to one preferred execution, the primer coating compositions for use herein comprise a mixture of epoxy silanes and amino silanes, as described above, optionally in combination with an alkoxy silane. According to this specific execution, the weight ratio: epoxy silane/amino silane is preferably comprised between 80/20 and 60/40, preferably between 75/25 and 65/35, more preferably of about 70/30. In the specific executions where an alkoxy silane is further incorporated, the weight ratio: epoxy silane/alkoxy silane is preferably comprised between 75/25 and 50/50, more preferably between 70/30 and 55/45, even more preferably between 65/35 and 60/40; and the weight ratio: amino silane/alkoxy silane is preferably comprised between 55/45 and 30/70, more preferably between 50/50 and 35/65, even more preferably between 45/55 and 40/60.

More preferably, the primer coating compositions comprise a mixture of 2-(3,4-epoxycyclohexyl)ethyltrimethoxysilane and 3-aminopropyltrimethoxysilane, or alternatively a mixture of 2-(3,4-Epoxycyclohexyl)ethyltriethoxysilane and 3-aminopropyltriethoxysilane, or alternatively a mixture of (3-glycidoxypropyl)trimethoxysilane and 3-aminopropyltrimethoxysilane, or alternatively a mixture of (3-glycidoxypropyl)triethoxysilane and 3-aminopropyltriethoxysilane. Even more preferably, the primer coating compositions comprise a mixture of 2-(3,4-epoxycyclohexyl)ethyltrimethoxysilane, 3-aminopropyltrimethoxysilane and tetraethoxysilane; or alternatively a mixture of (3-glycidoxypropyl)trimethoxysilane, 3-aminopropyltrimethoxysilane and tetraethoxysilane, or alternatively a mixture of 2-(3,4-epoxycyclohexyl)ethyltriethoxysilane, 3-aminopropyltriethoxysilane and tetraethoxysilane, or alternatively a mixture of (3-glycidoxypropyl)triethoxysilane, 3-aminopropyltriethoxysilane and tetraethoxysilane.

According to another preferred execution, the primer coating compositions for use herein comprise a mixture of at least one (meth)acryloyloxy silane, at least one multifunctional acrylic based additive, and optionally an alkoxysilane; wherein the multifunctional acrylic based additive is preferably selected from the group consisting of trimethylolpropane trimethacrylate, ethylenglycol dimethacrylate, and any combinations or mixtures thereof.

More preferably, the primer coating compositions comprise (meth)acryloyloxy silanes selected from the group consisting of 3-(acryloyloxy) propyl trimethoxysilane, 3-(methacryloyloxy) propyl trimethoxysilane, and any combinations or mixtures thereof, in combination with trimethylolpropane trimethacrylate. According to this specific execution, the weight ratio: 3-(acryloyloxy) propyl trimethoxysilane/trimethylolpropane trimethacrylate is preferably comprised between 95/5 and 60/40, preferably between 95/5 and 70/30, more preferably between 90/10 and 80/20. Similarly, the weight ratio: 3-(methacryloyloxy) propyl trimethoxysilane/trimethylolpropane trimethacrylate is preferably comprised between 95/5 and 60/40, preferably between 95/5 and 70/30, more preferably between 90/10 and 80/20.

Even more preferably, the primer coating compositions comprise a mixture of 3-(acryloyloxy) propyl trimethoxysilane, trimethylolpropane trimethacrylate and tetraethoxysilane. According to this specific execution, the weight ratio: [3-(acryloyloxy) propyl trimethoxysilane/trimethylolpropane trimethacrylate]/tetraethoxysilane is preferably comprised between 98/2 and 80/20, preferably between 98/2 and 90/10, more preferably between 96/4 and 92/8.

Alternatively, the primer coating compositions comprise 3-(methacryloyloxy) propyl trimethoxysilane, trimethylolpropane trimethacrylate, and any combinations or mixtures thereof.

The thermally activated primer coating compositions for use herein are typically prepared in solvent. Examples of suitable solvents include, but are not limited to, aliphatic and alicyclic hydrocarbons (e.g., hexane, heptane, cyclohexane), aromatic solvents (e.g., benzene, toluene, xylene), ethers (e.g., diethylether, glyme, diglyme, diisopropyl ether), esters (e.g., ethyl acetate, butyl acetate), ketones (e.g., acetone, methylethyl ketone, methyl isobutyl ketone), alcohols (ethanol, methanol, butylglycol, isopropanol), and mixtures thereof. Preferably the thermally activated primer compositions are prepared in ethanol in a concentration between 1 and 15% by weight, preferably in a concentration up to 5% by weight.

The photochemically activated primer coating compositions for use herein may further comprise a crosslinking agent. Useful crosslinking agents include, for example, polyacryl monomers (and the methacryl analogues thereof) selected from the group consisting of:
(a) diacryl containing compounds, such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, cyclohexanedimethanol diacrylate, diethylene glycol diacrylate, dipropylene glycol diacrylate, ethoxylated bisphenol A diacrylate, neopentyl glycol diacrylate, polyethylene glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate;

(b) tri-acryl containing compounds, such as glycerol triacrylate, trimethylolpropane triacrylate, ethoxylated triacrylates, pentaerythritol triacrylate, propoxylated triacrylates propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate;

(c) higher functionality acryl containing compounds such as ditrimethylolpropane tetraacrylate, dipentaerythritol pentaacrylate, ethoxylated (4) pentaerythritol tetraacrylate, pentaerythritol tetraacrylate, caprolactone modified dipentaerythritol hexaacrylate;

(d) oligomeric acryl compounds such as, for example, urethane acrylates, polyester acrylates, polyester polyurethane acrylates, epoxy acrylates; polyacrylamide analogues of the foregoing; and combinations thereof. Such compounds are widely available from vendors such as, for example, Sartomer Company (examples including CN965 and CN9009), Extort, Pa.; UCB Chemicals Corporation, Smyrna, Ga.; and Aldrich Chemical Company, Milwaukee, Wis.

Particular useful crosslinking agents for use herein include trimethylolpropane trimethacrylate, ethyleneglycol dimethacrylate and urethane acrylate oligomers.

The weight ratio between the ethylenically unsaturated silane and the crosslinking agent is preferably comprised between 95/5 and 1/99, preferably between 90/10 and 1/99.

The photochemically activated primer coating compositions for use herein may further comprise acid functional acrylates, such as for example acrylic acid and methacrylic acid. When used, these acid functional acrylates are preferably added in amounts of at most 1.5% by weight, preferably at most 1% by weight based on the total weight of the primer.

In order to facilitate photochemical activation (e.g. curing), the photochemically activated primer coating compositions preferably comprise at least one free-radical photoinitiator. Typically, such a photoinitiator comprises less than 15 percent by weight, more typically less than 12% percent based on the total weight of the at least one ethylenically unsaturated silane and the at least one crosslinking agent. Useful free-radical photoinitiators include, for example, those known as useful in the UV curing of acrylate polymers. Such initiators include benzophenone and its derivatives; benzoin such as alpha-methylbenzoin, alpha-phenylbenzoin, alpha-allylbenzoin, alpha-benzylbenzoin; benzoin ethers such as benzil dimethyl ketal (commercially available under the trade designation "IRGACURE 651" from Ciba Specialty Chemicals Corporation), benzoin methyl ether, benzoin ethyl ether, benzoin n-butyl ether; acetophenone and its derivatives such as 2-hydroxy-2-methyl-1-phenyl-1-propanone (commercially available under the trade designation "DAROCUR 1173" from Ciba Specialty Chemicals Corporation), 1-hydroxycyclohexyl phenyl ketone (commercially available under the trade designation "IRGACURE 184", also from Ciba Specialty Chemicals Corporation) and 2,2-dimethoxy-2-phenylacetophenone (commercially available under the trade designation "KB-1" from Polyscience Inc); 2-methyl-1-[4-(methylthio)phenyl]-2-(4-morpholinyl)-1-propanone commercially available under the trade designation "IRGACURE 907", also from Ciba Specialty Chemicals Corporation); 2-benzyl-2-(dimethylamino)-1-[4-(4-morpholinyl)phenyl]-butanone commercially available under the trade designation "IRGA-CURE 369" from Ciba Specialty Chemicals Corporation. Combinations of two or more photoinitiators may be used.

The photochemically activated primer coating compositions are typically prepared in a solvent. Examples of suitable solvents include aliphatic and alicyclic hydrocarbons (e.g., hexane, heptane, cyclohexane), aromatic solvents (e.g., benzene, toluene, xylene), ethers (e.g., diethylether, glyme, diglyme, diisopropyl ether), esters (e.g., ethyl acetate, butyl acetate), ketones (e.g., acetone, methylethyl ketone, methyl isobutyl ketone), alcohols (methanol, ethanol, isopropyl alcohol) and mixtures thereof. Preferably the photochemically activated primer coating compositions are prepared in methanol. After coating, the solvent is typically evaporated before the coating is subjected to photochemical activation, such as e.g. UV light.

The photochemically activated primer coating compositions for use herein may further comprise an organic or inorganic acid or base catalyst, in order to facilitate hydrolyses and condensation of the hydrolysable silane groups. Organic acid catalysts include acetic acid, citric acid, formic acid, triflic acid, perfluorobutyric acid and the like. Examples of inorganic acids include sulphuric acid and hydrochloric acid. Examples of useful base catalysts include sodium hydroxide, potassium hydroxide and triethylamine Organometallic catalysts can also be used. Examples include dibutyltindilaurate and tin di(2-ethylhexanoate). The catalyst will preferably be used in amounts between 0.01 and 10%, more preferably between 0.05 and 5% by weight of the total primer coating composition.

In a preferred aspect, the primer coating compositions for use herein, are free of silica particles, in particular free of silica nanoparticles, more in particular free of acidified silica nanoparticles.

Advantageously, the method of the present disclosure further comprises the step of incorporating into the assembly composed of the substrate and the silica nanoparticle coating, any additional components or elements commonly known in the art of coating assemblies. Exemplary components include, but are not limited to, protective layers, liners, backing layers, adhesive composition layers, mirror layers (e.g. aluminum vapor coat), prismatic layers, glass bead layers, and any combinations thereof. Suitable other components and suitable manner for incorporating thereof will be easily identified by those skilled in the art of coating assemblies. It will also be apparent to those skilled in the art that the incorporation of additional components into the assembly composed of the substrate and the silica nanoparticle coating, shall be such that the dew formation retarding effect is not detrimentally affected.

In another aspect, the present disclosure is directed to a coating assembly comprising a substrate and a silica nanoparticle coating thereon, wherein the silica nanoparticle coating is obtainable by any of the methods as described above, and wherein the substrate comprises an organic polymeric material, selected from the group consisting of poly(meth)acrylates, and any combinations or mixtures thereof. More preferably, the substrate for use herein comprises polymethylmethacrylate, even more preferably impact modified polymethylmethacrylate. Even more preferably, the substrate for use herein consists essentially of polymethylmethacrylate.

In the context of the present disclosure, it has been surprisingly discovered that the silica nanoparticle coating layers for use in the method of the present disclosure adhere very well to a variety of substrates, particularly organic polymeric substrates, and more particularly to polymeric substrates selected from poly(meth)acrylates, more preferably from polymethylmethacrylate. Accordingly, the (acidified) silica nanoparticle coating layers for use in the method according to the present disclosure, provide such coating assembly or coated substrates with excellent durability, UV stability and dry and/or wet abrasion resistance, in particular when coated to polymeric substrates selected from poly (meth)acrylates, more preferably from polymethylmethacrylate. Without wishing to be bound by theory, it is believed that such excellent durability, UV stability and dry and/or wet abrasion resistance is due to the low temperature sintering of the acidified silica nanoparticles.

In the context of an outdoor application or usage, it is of outmost importance that the corresponding coating assemblies, coated substrates or coated articles provide outstanding wet abrasion resistance, as the latter are subjected to various forms of precipitation such as dew formation, fog, rain and snow. Advantageously, the corresponding coating assemblies, coated substrates or coated articles are further provided with excellent dry abrasion resistance, which makes them more resistant to vandalism acts.

According to a preferred execution, the coating assembly according to the disclosure is further provided with a primer coating composition between the substrate and the silica nanoparticle coating. Suitable primer coating compositions for use in the coating assembly of the disclosure are identical to those described above for use in the method of retarding dew formation according to another aspect of the present disclosure. Preferably, the primer coating composition for use in the coating assembly of the disclosure comprises an organofunctional silane, preferably selected from the group consisting of epoxy silanes, amino silanes, (meth)acryloyloxy silanes, alkoxy silanes, and any combinations or mixtures thereof.

In a preferred execution, the coating assembly according to the disclosure has a static water contact angle of less than 50°, preferably less than 30°, more preferably less than 20°, even more preferably less than 10°, most preferably less than 5°, when measured according to the static water contact angle measurement method described in the experimental section.

In another preferred execution, the coating assembly according to the disclosure has a static water contact angle of less than 30°, preferably less than 20°, more preferably less than 10°, even more preferably less than 5°, after 100 dry abrasion cycles when measured according to the dry abrasion test method described in the experimental section.

In another preferred execution, the coating assembly according to the disclosure has a static water contact angle of less than 50°, preferably less than 30°, more preferably less than 20°, even more preferably less than 15°, still more preferably less than 10°, after 500 dry abrasion cycles when measured according to the dry abrasion test method described in the experimental section.

In another preferred execution, the coating assembly according to the disclosure has a static water contact angle of less than 30°, preferably less than 20°, more preferably less than 15°, after 1000 dry abrasion cycles when measured according to the dry abrasion test method described in the experimental section.

In another preferred execution, the coating assembly according to the disclosure has a static water contact angle of less than 30°, preferably less than 20°, more preferably less than 15°, even more preferably less than 10°, after 100 wet abrasion cycles when measured according to the wet abrasion test method described in the experimental section.

In another preferred execution, the coating assembly according to the disclosure has a static water contact angle of less than 50°, preferably less than 30°, more preferably less than 20°, even more preferably less than 15°, still more preferably less than 10°, after 500 wet abrasion cycles when measured according to the wet abrasion test method described in the experimental section.

In another preferred execution, the coating assembly according to the disclosure has a static water contact angle of less than 30°, preferably less than 25°, more preferably less than 20°, after 1000 wet abrasion cycles when measured according to the wet abrasion test method described in the experimental section.

In another preferred execution, the coating assembly according to the disclosure has a static water contact angle of less than 40°, preferably less than 35°, more preferably less than 30°, after 5000 wet abrasion cycles when measured according to the wet abrasion test method described in the experimental section.

In another preferred execution, the coating assembly according to the disclosure has a mechanical durability of at least 5 years, preferably at least 8 years, more preferably at least 10 years, even more preferably at least 12 years, when measured according to the durability test method described in the experimental section.

Advantageously, the coating assembly according to the disclosure may be provided with any additional components or elements commonly known in the art of coating assemblies or overlaminate coatings. Exemplary components include, but are not limited to, protective layers, liners, backing layers, adhesive composition layers, mirror layers (e.g. aluminum vapor coat), prismatic layers, glass bead layers, and any combinations thereof. Suitable other components and suitable manner for incorporating thereof will be easily identified by those skilled in the art of coating assemblies. It will also be apparent to those skilled in the art that the incorporation of additional components into the coating assembly, shall be such that the anti-dew properties thereof are not detrimentally affected.

Preferably, the coating assembly according to the disclosure is transparent or translucent to visible light. This specific execution may find particular use when the coating assembly is meant to be applied or coated as an overlaminate coating on various substrates. Alternatively, the coating assembly may not need to be transparent and may be completely opaque.

In some aspects the silica nanoparticle coating compositions provide improved cleanability and provide a tough, resistant layer that protects the substrate and the underlying coated article from damage such as scratches, or other damages resulting from abrasion and solvents. By "cleanability" it is meant to refer to the ability of the silica nanoparticle coating composition, when cured, to provide oil and soil resistance and help preventing the substrate and the coated article from being soiled by exposure to contaminants such as oils or adventitious dirt. The silica nanoparticle coating composition can also make any protective layer easier to clean if it is soiled, so only a simple rinsing step with water is required to remove contaminants. Providing improved cleanability is particularly advantageous when the silica nanoparticle coating compositions as described above are used in combination with articles meant for outdoor usage.

The silica nanoparticle coating compositions are preferably coated on the substrate using conventional techniques, such as bar, roll, curtain, rotogravure, spray, or dip coating techniques. The preferred methods include bar and roll coating, or air knife coating to adjust thickness. In order to ensure uniform coating and wetting of the film, it may be desirable to oxidize the substrate surface prior to coating using corona discharge or flame treatment methods.

The silica nanoparticle coatings of the present disclosure are preferably applied in uniform average thicknesses varying by less than about 200 Å, and more preferably by less than 100 Å, in order to avoid visible interference color variations in the coating. The optimal average dry coating thickness is dependent upon the particular coating composition, but in general the average thickness of the coating is between 500 and 2500 Å, preferably 750 to 2000 Å, and more preferably 1500 to 2000 Å, as measured using an ellipsometer such as a Gaertner Scientific Corp Model No. L115C. It should be noted, however, that while the average coating thickness is preferably uniform, the actual coating thickness can vary considerably from one particular point on the coating to another.

In one aspect, the silica nanoparticle coatings of the present disclosure may be coated on both sides of the substrate. Preferably, the silica nanoparticle coatings of the present disclosure are coated on only one side of the substrate. The opposite side of the substrate may be uncoated, or coated with any component layer commonly known to those skilled in the art of coating assemblies. Preferably, the opposite side is coated with an adhesive layer, and optionally provided with an additional liner layer.

Once coated, the article is typically dried at temperatures of between 20° C. and 150° C., preferably between 40° C. and 120° C., more preferably between 60° C. and 100° C., even more preferably between 70° C. and 90° C., in a re-circulating oven, in which an inert gas may be circulated. The temperature may be increased further to speed-up the drying process, but care must be exercised to avoid damage to the substrate.

According to the specific execution wherein a primer coating composition is further comprised between the substrate and the silica nanoparticle coatings, two alternative coating methods may be advantageously used herein.

According to a first preferred coating method, the substrate is coated with the primer coating solution and preferably dried at room temperature for about 15 minutes. The silica nanoparticle coating composition is then subsequently applied on top of the dried primer layer, and the overall coating assembly is submitted to a drying step at a temperature preferably comprised between 70° C. and 90° C., more preferably of about 80° C., for a period preferably comprised between 1 and 10 minutes, in a re-circulating oven.

According to a second preferred coating method, the substrate is coated with the primer coating solution and submitted to a drying step at a temperature preferably comprised between 50° C. and 80° C., more preferably of about 60° C., for a period preferably comprised between 1 and 10 minutes. The silica nanoparticle coating composition is then subsequently applied on top of the dried primer layer, and the overall coating assembly is submitted anew to a drying step at a temperature preferably comprised between 70° C. and 90° C., more preferably of about 80° C., for about 10 minutes. In the context of the present disclosure, this second method is more preferably used.

According to another aspect of the present disclosure, it is provided a coated article comprising a support and a coating assembly thereon, wherein the coating assembly is as described above. Suitable supports for use herein will be easily identified by those skilled in the art of coating assemblies. Exemplary supports for use in the coated article of the present disclosure comprise a material selected from the group consisting of polymeric materials such as e.g. polymeric films and sheet materials, glass, ceramic, organic and inorganic composite material, metal, and any combinations thereof. Suitable supports for use herein may comprise a material identical or different from that used to form the substrate for use in the method of the present disclosure as described above. The coating assembly is preferably coated onto the support using conventional techniques well known to those skilled in the art.

In some aspects, the coated articles of the disclosure comprise a support which may be of virtually any construction, having a flat, curved, or complex shape and having formed thereon a continuous network of agglomerated silica nanoparticles. When the coating assembly is applied to transparent supports to achieve increased light transmissivity, the coated article preferably exhibits a total average increase in transmissivity of normal incident light of at least two percent and up to as much as ten percent or more, depending on the support coated, over a range of wavelengths extending at least between 400 to 700 nm. An increase in transmissivity may also be seen at wavelengths into the ultraviolet and/or infrared portion of the spectrum. Preferred coating compositions applied to at least one side of a light transmissive substrate increase the percent transmission of the substrate by at least 5 percent, and preferably by 10 percent, when measured at 550 nm.

Preferably, the support for use herein is non-transparent, and more preferably completely opaque. In a very preferred aspect, the support comprises a retro-reflective material. Any commonly know retro-reflective material may be used herein. Suitable retro-reflective material for use herein may be easily identified by those skilled in the art. Exemplary retro-reflective materials include, but are not limited to retro-reflective (co)polymer films sold under the trade name DIAMOND GRADE sheeting (available from 3M Company, St. Paul, Minn.).

According to one aspect, the corresponding coated article is preferably selected from the group consisting of traffic signs, retro-reflective and graphic signage, informative and advertising panels, license plates for automotive vehicles, raised pavement markers, reflectors and linear delineation systems (LDS), advertisement light boxes, platforms or display supports bearing visually observable information, architectural glazing, decorative glass frames, motor vehicle windows and windshields, protective eye wear, and any combinations thereof. More preferably, the coated article is preferably selected from the group consisting of traffic signs, retro-reflective and graphic signage, and raised pavement markers.

The coating assemblies as described above provide excellent dew formation retarding capabilities when applied onto various supports, in particular to supports comprising a material selected from the group consisting of polymeric materials such as e.g. polymeric films and sheet materials, glass, ceramic, organic and inorganic composite material, metal, and any combinations thereof.

Surprisingly, it has been found that the silica nanoparticle coating layers and the coating assemblies as described above provide excellent dew formation retarding capabilities when applied to the surface of an article comprising a retro-reflective support, while maintaining high degree of retro-reflectivity of the retro-reflective support, in particular when the article is used in outdoor applications/environment.

Typically, the silica nanoparticle coating layers and the coating assemblies as described above when applied onto the surface of an article comprising a retro-reflective support, are capable of maintaining high degree of retro-reflectivity under both "dry" conditions (i.e. during daytime)

and "wet" conditions (i.e. during nighttime when dew formation predominantly occurs).

In another aspect, the present disclosure relates to the use of a silica nanoparticle coating or a coating assembly as described above for retarding dew formation on the surface of an article comprising a retro-reflective support (and intended for outdoor usage), wherein the substrate preferably comprises an organic polymeric material. More preferably, the substrate comprises an organic polymeric material selected from the group consisting of poly(meth)acrylates, polyurethanes, polyesters, polycarbonates, polyolefins, and any combinations or mixtures thereof. In a more preferred aspect of this use according to the disclosure, the substrate comprises poly(meth)acrylates, and any combinations or mixtures thereof. More preferably, the substrate comprises polymethylmethacrylate, even more preferably impact modified polymethylmethacrylate. According to still a more preferred aspect of this use according to the disclosure, the substrate consists essentially of polymethylmethacrylate.

Item 1 is a method for retarding dew formation on the surface of an article comprising a retro-reflective support, the method comprising the steps of:
a) providing a substrate;
b) contacting at least part of the surface of the substrate with a silica nanoparticle coating composition comprising:
  i. an aqueous dispersion of a mixture of silica nanoparticles having an average particle diameter of 40 nanometers or less and silica nanoparticles having an average particle diameter greater than 40 nanometers, the aqueous dispersion having a pH of less than 5, and
  ii. an acid having a pKa of less than 5;
c) drying the coating composition so as to provide a silica nanoparticle coating onto the substrate, and thereby forming a coating assembly; and
d) applying the coating assembly onto at least part of the retro-reflective support.

Item 2 is a method for retarding dew formation on the surface of an article comprising a retro-reflective support, the method comprising the steps of:
a) providing a substrate;
b) contacting at least part of the surface of the substrate with a silica nanoparticle coating composition comprising:
  i. an aqueous dispersion of a mixture of acicular silica nanoparticles and spherical silica nanoparticles, the aqueous dispersion having a pH of less than 5, and
  ii. an acid having a pKa of less than 5;
c) drying the coating composition so as to provide a silica nanoparticle coating onto the substrate, and thereby forming a coating assembly; and
d) applying the coating assembly onto at least part of the retro-reflective support.

Item 3 is a method for retarding dew formation on the surface of an article comprising a retro-reflective support, the method comprising the steps of:
a) providing a substrate;
b) contacting at least part of the surface of the substrate with a silica nanoparticle coating composition comprising:
  i. an aqueous dispersion of core-shell particles, each core-shell particle comprising a polymer core surrounded by a shell consisting essentially of silica nanoparticles, preferably of nonporous silica nanoparticles, disposed on the polymer core, the aqueous dispersion having a pH of less than 5, and
  ii. an acid having a pKa of less than 5;
c) drying the coating composition so as to provide a silica nanoparticle coating onto said substrate, and thereby forming a coating assembly; and
d) applying the coating assembly onto at least part of the retro-reflective support.

Item 4 is the method of item 3, wherein the (nonporous) silica nanoparticles have an average particle diameter of 60 nanometers or less.

Item 5 is the method according to any of the preceding items, wherein the article is intended for outside usage.

Item 6 is the method according to any of the preceding items, wherein the substrate comprises a material selected from the group consisting of polymeric materials (such as polymeric films and sheet materials), glass, ceramic, organic and inorganic composite material, metal, and any mixtures or combinations thereof.

Item 7 is the method of item 6, wherein the substrate comprises an organic polymeric material, preferably selected from the group consisting of poly(meth)acrylates, polyurethanes, polyesters, polycarbonates, polyolefins, and any combinations or mixtures thereof.

Item 8 is the method of item 7, wherein the substrate comprises polymethylmethacrylate, preferably impact modified polymethylmethacrylate.

Item 9 is the method of item 8, wherein the substrate consists essentially of polymethylmethacrylate.

Item 10 is the method according to any of the preceding items, wherein the substrate comprises a material which is transparent or translucent to visible light.

Item 11 is the method according to any of the preceding items further comprising the step of applying a primer coating composition to the surface of the substrate prior to the step of contacting the surface of the substrate with the silica nanoparticle coating composition.

Item 12 is the method of item 11, wherein the primer coating composition comprises an organofunctional silane.

Item 13 is the method of item 12, wherein the organofunctional silane has the following chemical formula:

wherein:
$R^1$ is an alkyl, preferably comprising 1 to 6, more preferably 1 to 4 carbon atoms, even more preferably $R^1$ is selected from the group consisting of methyl, ethyl, propyl, butyl, and acetyl, still more preferably from the group consisting of methyl and ethyl;
m=1 to 3, preferably m=2 or 3;
n=0 to 12, preferably n=0 to 3, more preferably n=2 or 3;
Y is a functional group, preferably selected from the group consisting of alkoxy, epoxycyclohexyl, glycidyl, glycidyloxy, halogen, (meth)acryloyl, (meth)acryloyloxy, —NH—CH$_2$—CH$_2$—NR$^2$R$^3$, —NR$^2$R$^3$ (with $R^2$ and $R^3$ being independently selected from the group consisting of H, alkyl, phenyl, benzyl, cyclopentyl and cyclohexyl).

Item 14 is the method according to any of item 12 or 13, wherein the organofunctional silane is selected from the group consisting of epoxy silanes, amino silanes, (meth)acryloyloxy silanes, alkoxy silanes, and any combinations or mixtures thereof.

Item 15 is the method according to any of items 12 to 14, wherein the organofunctional silane is selected from the group consisting of 2-(3,4-epoxycyclohexyl)ethyltrimethoxysilane; (3-glycidoxypropyl)trimethoxysilane; 3-aminopropyltrimethoxysilane; 3-(2-aminoethylamino) propyltrimethoxysilane; tetraethoxysilane; 3-(acryloyloxy) propyl trimethoxysilane; 3-(methacryloyloxy) propyl trimethoxysilane; and any combinations or mixtures thereof.

Item 16 is the method according to any of items 12 to 15, wherein the primer coating composition comprises a mixture of 2-(3,4-epoxycyclohexyl)ethyltrimethoxysilane, 3-aminopropyltrimethoxysilane and tetraethoxysilane, or alternatively a mixture of (3-glycidoxypropyl)trimethoxysilane, 3-aminopropyltrimethoxysilane and tetraethoxysilane, or alternatively a mixture of 2-(3,4-epoxycyclohexyl)ethyltriethoxysilane, 3-aminopropyltriethoxysilane and tetraethoxysilane, or alternatively a mixture of (3-glycidoxypropyl)triethoxysilane, 3-aminopropyltriethoxysilane and tetraethoxysilane.

Item 17 is the method according to any of items 12 to 16, wherein the primer coating composition is free of silica particles, in particular free of silica nanoparticles, more in particular free of acidified silica nanoparticles.

Item 18 is the method according to any of the preceding items, wherein the silica nanoparticles are not surface modified or surface functionalized.

Item 19 is a coating assembly comprising a substrate and a silica nanoparticle coating thereon, wherein the silica nanoparticle coating is obtainable by the method according to any of items 1 to 4, and wherein the substrate comprises a material selected from the group consisting of poly(meth)acrylates, and any combinations or mixtures thereof.

Item 20 is the coating assembly of item 19, wherein the substrate comprises polymethylmethacrylate, preferably impact modified polymethylmethacrylate.

Item 21 is the coating assembly of item 20, wherein the substrate consists essentially of polymethylmethacrylate.

Item 22 is the coating assembly according to any of items 19 to 21, wherein the substrate comprises a material which is transparent or translucent to visible light.

Item 23 is the coating assembly according to any of items 19 to 22, which further comprises a primer coating composition between the substrate and the silica nanoparticle coating.

Item 24 is the coating assembly of item 23, wherein the primer coating composition comprises an organofunctional silane.

Item 25 is the coating assembly of item 24, wherein the organofunctional silane has the following chemical formula:

wherein:
$R^1$ is an alkyl, preferably comprising 1 to 6, more preferably 1 to 4 carbon atoms, even more preferably $R^1$ is selected from the group consisting of methyl, ethyl, propyl, butyl, and acetyl, still more preferably from the group consisting of methyl and ethyl;
m=1 to 3, preferably m=2 or 3;
n=0 to 12, preferably n=0 to 3, more preferably n=2 or 3;
Y is a functional group, preferably selected from the group consisting of alkoxy, epoxycyclohexyl, glycidyl, glycidyloxy, halogen, (meth)acryloyl, (meth)acryloyloxy, —NH—CH$_2$—CH$_2$—NR$^2$R$^3$, —NR$^2$R$^3$ (with R$^2$ and R$^3$ being independently selected from the group consisting of H, alkyl, phenyl, benzyl, cyclopentyl and cyclohexyl).

Item 26 is the coating assembly according to any of item 24 or 25, wherein the organofunctional silane is selected from the group consisting of epoxy silanes, amino silanes, (meth)acryloyloxy silanes, alkoxy silanes, and any combinations or mixtures thereof.

Item 27 is the coating assembly according to any of items 24 to 26, wherein the organofunctional silane is selected from the group consisting of 2-(3,4-epoxycyclohexyl)ethyltrimethoxysilane; (3-glycidoxypropyl)trimethoxysilane; 3-aminopropyltrimethoxysilane; 3-(2-aminoethylamino) propyltrimethoxysilane; tetraethoxysilane; 3-(acryloyloxy) propyl trimethoxysilane; 3-(methacryloyloxy) propyl trimethoxysilane; and any combinations or mixtures thereof.

Item 28 is the coating assembly according to any of items 24 to 27, wherein the primer coating composition comprises a mixture of 2-(3,4-epoxycyclohexyl)ethyltrimethoxysilane, 3-aminopropyltrimethoxysilane and tetraethoxysilane, or alternatively a mixture of (3-glycidoxypropyl)trimethoxysilane, 3-aminopropyltrimethoxysilane and tetraethoxysilane, or alternatively a mixture of 2-(3,4-epoxycyclohexyl)ethyltriethoxysilane, 3-aminopropyltriethoxysilane and tetraethoxysilane, or alternatively a mixture of (3-glycidoxypropyl)triethoxysilane, 3-aminopropyltriethoxysilane and tetraethoxysilane.

Item 29 is the coating assembly according to any of items 24 to 28, wherein the primer coating composition is free of silica particles, in particular free of silica nanoparticles, more in particular free of acidified silica nanoparticles.

Item 30 is the coating assembly according to any of items 24 to 29, wherein the silica nanoparticles are not surface modified or surface functionalized.

Item 31 is the coating assembly according to any of items 24 to 30, which has a static water contact angle of less than 50°, preferably less than 30°, more preferably less than 20°, even more preferably less than 10°, most preferably less than 5°, when measured according to the static water contact angle measurement method described in the experimental section.

Item 32 is the coating assembly according to any of items 24 to 31, which has a static water contact angle of less than 50°, preferably less than 30°, more preferably less than 20°, even more preferably less than 10°, after 500 dry abrasion cycles when measured according to the dry abrasion test method described in the experimental section.

Item 33 is a coating assembly according to any of items 24 to 32, which has a static water contact angle of less than 50°, preferably less than 30°, more preferably less than 20°, even more preferably less than 10°, after 500 wet abrasion cycles when measured according to the wet abrasion test method described in the experimental section.

Item 34 is a coated article comprising a support and a coating assembly according to any of items 24 to 33 thereon.

Item 35 is the coated article of item 34, wherein the support comprises a retroreflective material.

Item 36 is a coated article according to any of item 34 or 35, which is selected from the group consisting of traffic signs, retroreflective and graphic signage, informative and advertising panels, license plates for automotive vehicles, raised pavement markers, reflectors and linear delineation systems (LDS), advertisement light boxes, platforms or display supports bearing visually observable information, and any combinations thereof; more preferably, the article is selected from the group consisting of traffic signs, retroreflective and graphic signage, and raised pavement markers.

Item 37 is the use of a silica nanoparticle coating obtainable by the method according to any of items 1 to 4 or a coating assembly according to any of items 19 to 33, for retarding dew formation on the surface of an article comprising a retro-reflective support.

Item 38 is the use according to item 37, wherein the substrate preferably comprises an organic polymeric material, more preferably an organic polymeric material selected from the group consisting of poly(meth)acrylates, polyurethanes, polyesters, polycarbonates, polyolefins, and any combinations or mixtures thereof.

Item 39 is the use according to item 38, wherein the substrate comprises polymethylmethacrylate, preferably impact modified polymethylmethacrylate. More preferably, the substrate consists essentially of polymethylmethacrylate.

The present disclosure will be explained in more detail with the following non-limiting examples. Unless specified otherwise, percentages are percentages by weight with respect to the mass of the total compositions and add up in each case to 100 weight percent.

EXAMPLES

Test Methods:
Static Water Contact Angle Measurement [W.C.A.]

Static water contact angle measurements are performed using deionised water, obtained from Millipore Corporation. The contact angle analyzer used is a video contact angle analyzer "VCA Optima" (available from AST Products Inc.). The static contact angles are measured on a sessile drop (1 µL), 30 sec after deposition. The values reported are the average of at least 4 separate measurements.

Dry Abrasion Test

Dry abrasion tests are performed on a Reciprocating Abraser (Model 5900, available from TABER INDUSTRIES). Dry abrasions are tested by employing a force of 14 N and a velocity of 35 cycles/min (1380 g weight). The cloth used for testing is 13.5 Crockmeter cloth (Crockmeter squares, 100% cotton).

Wet Abrasion Test

Wet abrasion tests are performed on a Reciprocating Abraser (Model 5900, available from TABER INDUSTRIES). Wet abrasions are tested by employing a force of 14 N and a velocity of 35 cycles/min (1380 g weight). Wet abrasion is performed employing deionized water. The cloth used for testing is 13.5 Crockmeter cloth (Crockmeter squares, 100% cotton).

Durability Test

Durability tests are performed in accordance with the Artificial Weathering Test described in EN ISO 4892-2. The tested samples shall be such that they fulfill the performance requirements described in EN 12899-1:2008-2, after a testing duration of 2000 hours.

Substrates:
PMMA-1: 3M Scotchlite Diamond Grade DG34095 polymethylmethacrylate film (available from 3M).

PMMA-2: 76 µm thick polymethylmethacrylate film made from Plaskolite CA923 UVA2 resin (available from Plaskolite).

PMMA-3: 50 µm thick polymethylmethacrylate film made from Plaskolite CA945 UVA10 resin (available from Plaskolite).

Polycarbonate (PC) film: available under the tradename LEXAN 8010 (available from GE Advanced Materials).

Polyethylene terephthalate (PET) film: MELINEX 618 (available from E.I. du Pont de Nemours).

PVDC primed PET: Polyvinylidene dichloride primed polyethylene terephthalate film.

Materials Used:

| Abbreviation | Composition | Availability |
|---|---|---|
| ACROPTMOS | 3-(acryloyloxy) propyl tri-methoxysilane | ALFA AESAR |
| APTMOS | 3-aminopropyl trimethoxysilane | ALFA AESAR |
| ECHETMOS | 2-(3,4-epoxycyclohexyl) ethyl-trimethoxysilane | GELEST INC. |
| GPTMOS | (3-glycidoxypropyl) trimethoxysilane (97%) | ALFA AESAR |
| TEOS | Tetraethoxysilane $Si(OC_2H_5)_4$ | ALDRICH |
| A-174 | 3-(methacryloyloxy) propyl tri-methoxysilane | ALFA AESAR |
| AA | Acrylic acid | ALDRICH |
| MAA | Methacrylic acid | ALDRICH |
| SR350 | Trimethylolpropane trimethacrylate | SARTOMER |
| EGDMA | Ethylene glycol dimethacrylate | ALDRICH |
| CN965 | Aliphatic polyester based urethane diacrylate oligomer | SARTOMER |
| CN9009 | Aliphatic urethane acrylate oligomer | SARTOMER |
| A-612 | NEOCRYL A-612, 30 wt % acrylic resin in water | DSM |
| R-966 | NEOREZ R-966, 33 wt % poly-urethane dispersion in water | DSM NEO RESINS |
| KB-1 | 2,2-dimethoxy-2-phenylacetophenone | POLYSCIENCE INC. |

Silica Nanoparticles

NALCO 8699 (2-4 nm, 15.1 wt % in water), available from NALCO.

NALCO 1115 (4 nm, sodium stabilized, 10 wt % in water), available from NALCO.

NALCO 2329 (75 nm, 40.5 wt % in water), available from NALCO.

SI-5540 (120 nm, 38 wt % in water), available from SILCO.

SNOWTEX-UP: aqueous dispersion of elongated silica particles; 9-15 nm/40-100 nm; 21.2 wt % in water, available from NISSAN.

LEVASIL 500/15 (6 nm particles, 15 wt % in water), available from AKZO NOBEL.

Sample Preparation:
A) Silica Nanoparticle Coating Compositions:
SIL-1: NALCO 8699/SI-5540 (70/30)

23.18 g of NALCO 8699 are diluted with 56.82 g of distilled water. In a separate beaker 3.97 g SI-5540 are diluted with 16.03 g of distilled water. Both dispersions are then mixed and acidified with nitric acid to pH 2. The mixture has a total solid content of 5 wt %. The resulting dispersion is stirred for 10 min at room temperature before coating.

SIL-2: SNOWTEX-UP/NALCO 1115 (70/30)

7.07 g of SNOWTEX-UP dispersion are diluted with 12.93 g of distilled water. To this dispersion, 75 g of diluted NALCO 1115 (35 g NALCO 1115+45 g distilled water) are slowly added and the dispersion is acidified with nitric acid to pH 2. The resulting dispersion is stirred for 10 min at room temperature prior to coating.

SIL-3: Core-Shell NALCO 1115/A-612 (90/10)

45 g NALCO 1115 (10 wt %) are diluted with 35 g of distilled water. 1.67 g A-612 are diluted with 18.33 g distilled water and dropwise added to the silica dispersion. The dispersion is then acidified with nitric acid to a pH of 2. The resulting dispersion is stirred for 10 min at room temperature prior to coating.

SIL-4: Core-Shell SNOWTEX-UP/A-612/NALCO 1115 (7/3/90)

16.5 g SNOWTEX-UP dispersion (21.2 wt %) are diluted with 63.5 g of distilled water. In a separate beaker, 5 g A-612 (30 wt %) are diluted with 15 g of distilled water. Both solutions are then mixed and acidified with nitric acid to pH 2. The solution has a total solid content of 5 wt %. 10 g of the thus obtained solution are diluted with 45 g of distilled water. To this mixture, 45 g of acidified NALCO 1115 (10 wt %, pH 2) are added. The resulting dispersion is stirred for 10 min at room temperature prior to coating.

SIL-5: Core-Shell NALCO 1115/A-612/SNOWTEX-UP (63/7/90)

To 7 g SIL-3, is added dropwise, a dispersion of 0.71 g Snowtex-UP (21.2 wt %) in 2.29 g distilled water, acidified with nitric acid to pH 2. The resulting dispersion is stirred for 10 min at room temperature prior to coating.

SIL-6: Core-Shell NALCO 1115/R-966 (90/10)

45 g NALCO 1115 (10 wt %) are diluted with 35 g of distilled water. 1.67 g R-966 (33 wt %) are diluted with 18.33 g distilled water and dropwise added to the silica dispersion. The dispersion is then acidified with nitric acid to a pH of 2. The resulting dispersion is stirred for 10 min at room temperature prior to coating.

SIL-7: Core-Shell NALCO 1115/R-966/NALCO 2329 (63/7/30)

45 g NALCO 1115 (10 wt %) are diluted with 35 g of distilled water. 1.67 g R-966 (33 wt %) are added dropwise and the solution is acidified with nitric acid to a pH of 2.

35 g of the thus obtained dispersion are mixed with a diluted and acidified NALCO 2329 dispersion (1.85 g+13.15 g distilled water). The resulting dispersion is stirred for 10 min at room temperature prior to coating.

SIL-8: Core-Shell NALCO 1115/R-966/SNOWTEX-UP (63/7/30)

To 7 g of SIL-6 is added dropwise, a dispersion of 0.71 g Snowtex-UP (21.2 wt %) in 2.29 g distilled water, acidified with nitric acid to pH 2. The resulting dispersion is stirred for 10 min at room temperature prior to coating.

B) Primer Compositions:

Thermally Activated Primer Compositions

Thermally activated primer compositions are prepared by diluting the primer with ethanol to a solid content as given in the examples. Primer compositions comprising a mixture of components are prepared by mixing the ingredients as given in the examples in ethanol. The primer compositions are mixed at room temperature during 60 min, prior to coating.

Photochemically Activated Primer Compositions

Several photochemically activated primer compositions as given in Table 1 below are prepared at 10% solids, according to the procedure as given for photochemically activated primer UVPR-3 ([ACROPTMOS/SR350 (90/10)]/TEOS: 95/5):

UVPR-3 is prepared by mixing following ingredients:

A174 (3-(Methacryloyloxy)propyl trimethoxysilane): 136.8 g

Methanol (MeOH): 1440 g

SR350 (Trimethylolpropane trimethacrylate): 15.2 g

TEOS (Tetraethoxysilane): 8 g 5 drops 0.1 N HCl 144 g MeOH+16 g KB-1 (2.2-dimethoxy-2-phenylacetophenone)

TABLE 1

Photochemically activated primer compositions

| Primer | Ingredients | Ratio (wt %) |
|---|---|---|
| UVPR-1 | A174/SR350 | 90/10 |
| UVPR-2 | ACROPTMOS/SR350 | 90/10 |
| UVPR-3 | [ACROPTMOS/SR350 (90/10)]/TEOS | 95/5 |
| UVPR-4 | [ACROPTMOS/SR350 (90/10)]/TEOS/AA | 94/5/1 |
| UVPR-5 | [ACROPTMOS/SR350 (90/10)]/TEOS/MAA | 94/5/1 |
| UVPR-6 | [ACROPTMOS/EGDMA (90/10)]/TEOS | 95/5 |
| UVPR-7 | [ACROPTMOS/SR350 (90/10)]/TEOS | 90/10 |
| UVPR-8 | [A174/CN9009 (10/90)]/SR350 | 99/1 |
| UVPR-9 | [A174/CN965 (10/90)]/SR350 | 99/1 |

Coating Method:

Prior to coating, the substrates are cleaned with isopropanol. The compositions are coated onto the substrates using a Mayer bar coater (commercially available from R D SPECIALTIES Inc, Webster, USA), set at a thickness of 6.

1. Silica Nanoparticle Coating

In one embodiment the silica nanoparticle coating composition is coated directly onto the substrate at room temperature. The coated substrate is dried in an oven at 80° C. during 10 min.

2. Primer Coating and Silica Nanoparticle Coating

In an alternative embodiment, the substrate is first coated with a thermally or photochemically activated primer composition. In a second step, the silica nanoparticle coating composition is applied on top of the dried/cured primer coating.

2.1. Thermally Activated Primer and Silica Nanoparticle Coating

The thermally activated primer composition is coated onto the substrate (Mayer bar coater 6). The substrate is heated in an oven at 80° C. during 10 minutes. After the substrate is cooled to room temperature, the silica nanoparticle composition is coated on top of the dried/cured primer coating (Mayer Bar 6). The coated substrate is heated in an oven at 80° C. during 10 min.

2.2. Photochemically Activated Primer and Silica Nanoparticle Coating

The photochemically activated primer composition is coated onto the substrate (Mayer Bar 6) and then dried in an oven at 80° C. for 1 min (in order to remove any solvent). The coating is then placed on a conveyer belt coupled to an ultraviolet ("UV") light curing device. UV curing is done under nitrogen using a Fusion 500 watt H or D bulb at 0.218 m/s. (UV lamp available from Fusion UV systems, Inc. Gaithersburg, Md. (USA)).

After UV curing, the primed substrate is coated with the silica nanoparticle coating composition (Mayer Bar 6) and dried in an oven at 80° C. during 10 min.

Examples

Examples 1 to 10, Comparative Example C-1 and Reference Examples Ref-1 and Ref-2

In examples 1 to 10, PMMA substrates are coated with silica nanoparticle compositions as given in Table 2. In comparative example C-1, PMMA-2 is coated with an acidified 5 wt % aqueous dispersion of silica nanoparticles LEVASIL 500/15. All dispersions are coated and dried according to the general procedure outlined. Static water contact angles are measured after the dried substrates are cooled to room temperature. The results are listed in Table 2. The values recorded for Ref-1 and Ref-2 are obtained respectively on uncoated PMMA-1 and PMMA-2 substrates. Some of the coated PMMA substrates are subjected to abrasion under wet and dry conditions. The results of the static water contact angles after abrasion are given in Table 3.

TABLE 2

| Example | Silica nanoparticle composition | PMMA substrate | WCA [°] PMMA |
|---|---|---|---|
| 1 | SIL-1 | PMMA-1 | 8.7 ± 1.9 |
| 2 | SIL-1 | PMMA-2 | <5 |
| 3 | SIL-2 | PMMA-2 | 6.1 ± 1.8 |
| 4 | SIL-3 | PMMA-1 | 11.6 ± 1.8 |
| 5 | SIL-4 | PMMA-1 | 9.5 ± 1.3 |
| 6 | SIL-4 | PMMA-2 | 9.4 ± 1.3 |
| 7 | SIL-5 | PMMA-1 | 8.9 ± 1.8 |
| 8 | SIL-6 | PMMA-1 | 13.3 ± 2.9 |
| 9 | SIL-7 | PMMA-2 | 12.7 ± 0.9 |
| 10 | SIL-8 | PMMA-1 | 16.1 ± 4.8 |
| C-1 | Levasil 500/15 | PMMA-2 | 49.2 ± 2.3 |
| Ref-1 | / | PMMA-1 | 70.2 ± 1.0 |
| Ref-2 | / | PMMA-2 | 76.9 ± 1.7 |

TABLE 3

| Example | WCA [°] initial | Abrasion cycles | WCA [°] Wet abrasion | WCA [°] Dry abrasion |
|---|---|---|---|---|
| Ex 2 | <5 | 500x | 16.8 ± 2.4 | 6.7 ± 2.8 |
|  |  | 1000x | 12.2 ± 1.7 | 10.2 ± 2.0 |
| Ex 3 | 6.1 ± 1.8 | 500x | 13.8 ± 3.3 | 22.0 ± 12.2 |
|  |  | 1000x | 19.2 ± 2.2 | 59.1 ± 12.2 |
| Ex 6 | 9.4 ± 1.3 | 100x | 19.2 ± 1.6 | 27.6 ± 2.1 |
|  |  | 500x | 17.0 ± 1.4 | 26.1 ± 7.6 |
| Ex 9 | 12.7 ± 0.9 | 500x | 23.0 ± 2.3 | 14.5 ± 7.0 |
|  |  | 1000x | 27.8 ± 2.7 | 13.2 ± 1.9 |

Examples 11 to 13 and Reference Example Ref-1

In examples 11 to 13 PMMA-1 substrates are first coated with a primer composition of GPTMOS in ethanol, in a concentration as given in table 4. The primer is coated and dried according to the general procedure as given above. After the substrate is cooled to room temperature, silica nanoparticle composition SIL-4 is coated on top of the dried primer coating (Mayer Bar 6). The coated substrate is heated in an oven at 80° C. during 10 min. Static water contact angles are measured before ("WCA [°] Initial") and after dry abrasion ("WCA [°] Dry Abrasion"). The results are given in Table 4. The values recorded for Ref-1 are obtained on uncoated PMMA-1 substrate.

TABLE 4

| Example | Primer layer GPTMOS | WCA [°] Initial | Dry abrasion cycles | WCA [°] dry Abrasion |
|---|---|---|---|---|
| 11 | 1% in EtOH | 6.5 ± 1.2 | 500x | 16.6 ± 3.1 |
|  |  |  | 1000x | 27.6 ± 2.5 |
| 12 | 3% in EtOH | 6.3 ± 1.0 | 500x | 21.0 ± 0.9 |
|  |  |  | 1000x | 14.7 ± 5.7 |
| 13 | 5% in EtOH | 10.7 ± 1.0 | 500x | 13.1 ± 1.4 |
|  |  |  | 1000x | 14.0 ± 3.4 |
| Ref-1 | / | 70.2 ± 1.0 | 500x | 63.2 ± 4.7 |
|  |  |  | 1000x | 61.2 ± 3.1 |

Examples 14 to 22

In examples 14 to 22, PMMA-2 substrates are first coated with a photochemically activated primer composition (10 wt % in methanol) as given in Table 5. The primer compositions are coated, dried and UV cured according to the general procedure as given above. After the substrates are cooled to room temperature, silica nanoparticle compositions as given in Table 5 are coated on top of the dried primer layer (Mayer Bar 6). The coated substrates are heated in an oven at 80° C. during 10 min. Static water contact angles are measured before ("WCA [°] Initial") and after wet and dry abrasion ("WCA [°] Wet Abrasion" and "WCA [°] Dry Abrasion" respectively). The results are listed in Table 5 below.

TABLE 5

| Ex | Photochemically-activated primer | Silica nanoparticle composition | WCA [°] initial | Abrasion cycles | WCA [°] wet abrasion | WCA [°] dry abrasion |
|---|---|---|---|---|---|---|
| 14 | UVPR-1 | SIL-4 | 8.5 ± 0.7 | 500x | 22.1 ± 2.0 | 10.9 ± 2.3 |
| 15 | UVPR-2 | SIL-4 | 8.3 ± 1.0 | 500x | 15.8 ± 1.5 | 9.5 ± 1.7 |
| 16 | UVPR-3 | SIL-4 | 8.3 ± 0.7 | 500x | 11.4 ± 1.8 | 12.4 ± 1.3 |
|  |  |  |  | 1000x | 13.4 ± 1.6 | 14.7 ± 2.3 |
| 17 | UVPR-4 | SIL-4 | 6.1 ± 1.4 | 1000x | 19.9 ± 2.5 | 32.1 ± 9.1 |
| 18 | UVPR-5 | SIL-4 | 8.7 ± 1.6 | 1000x | 22.0 ± 1.3 | 11.4 ± 3.8 |
| 19 | UVPR-6 | SIL-4 | <5 | 1000x | 20.9 ± 1.9 | 18.9 ± 2.3 |
| 20 | UVPR-7 | SIL-4 | 7.9 ± 1.2 | 500x | 20.0 ± 2.4 | 23.2 ± 4.4 |
|  |  |  |  | 1000x | 16.2 ± 2.6 | ND(*) |
| 21 | UVPR-1 | SIL-7 | 6.1 ± 1.7 | 500x | 23.5 ± 4.6 | 10.3 ± 1.1 |
| 22 | UVPR-2 | SIL-7 | 11.7 ± 2.6 | 500x | 22.8 ± 3.9 | 11.9 ± 2.6 |

(*)not determined.

Examples 23 to 28

In examples 23 to 28 various substrates as indicated in Table 6 are coated with a silica nanoparticle composition, alone or in combination with a thermally or photochemically activated primer coating as given in Table 6. The coated substrates are abraded in dry conditions. Static water contact angles are measured before ("WCA [°] Initial") and after dry abrasion ("WCA [°] Dry Abrasion"). The results are listed in Table 6. The values recorded for Ref-3 to Ref-6 are the initial WCA values for the corresponding uncoated substrates.

TABLE 6

| Example | Primer composition | Silica nanoparticle composition | WCA [°] initial | Abrasion cycles | WCA [°] dry abrasion |
|---|---|---|---|---|---|
| Substrate: PMMA-3 | | | | | |
| 23 | / | SIL-4 | <5 | 500x | 36.4 ± 2.3 |
| Ref-3 | / | / | 72.4 ± 3.1 | / | ND (*) |
| Substrate: PET | | | | | |
| 24 | / | SIL-4 | <5 | 100x | 64.9 ± 0.8 |
| Ref-4 | / | / | 72.1 | / | ND (*) |
| Substrate: Polycarbonate | | | | | |
| 25 | / | CSPA-2 | <5 | 100x | 42.3 ± 9.4 |
| 26 | UVPR-3 | CSPA-2 | <5 | 100x | 28.6 ± 5.6 |
| Ref-5 | / | / | 86.2 | / | ND (*) |
| Substrate: PVDC primed PET | | | | | |
| 27 | / | SIL-4 | 20.9 ± 3.2 | 100x | 10.0 ± 3.8 |
| 28 | UVPR-3 | SIL-4 | <5 | 100x | 9.7 ± 2.0 |
| Ref-6 | / | / | 24.1 | / | ND (*) |

(*) not determined.

Example 29

In example 29, an overnight outdoor dew retarding experiment is performed on 60 cm×60 cm aluminum panels onto which are laminated conventional reflective sheeting for traffic signs, thereby forming the testing supports. An exemplary coating assembly according to the present disclosure is then laminated onto one of the testing supports (panel (A)), while panel (B) represents a non-coated testing support. The exemplary coating assembly uses a silica nanoparticle coating obtainable from an aqueous dispersion comprising a mixture of silica nanoparticles having an average particle diameter of less than 40 nanometers and silica nanoparticles having an average particle diameter greater than 40 nanometers, in a 70/30 weight ratio, the aqueous dispersion having a pH of less than 5.

Panels (A) and (B) are then placed in an outdoor testing site (3M Germany, Hilden) overnight. A digital camera is used to qualitatively evaluate overnight the changes in terms of retro-reflection of the various panels upon light exposure (with conventional illuminating lamps for cars) at various moments in time. The digital camera and the illuminating lamps are located at about 50 meters away from the panels. The results are pictured in FIG. 1.

Figure 1:
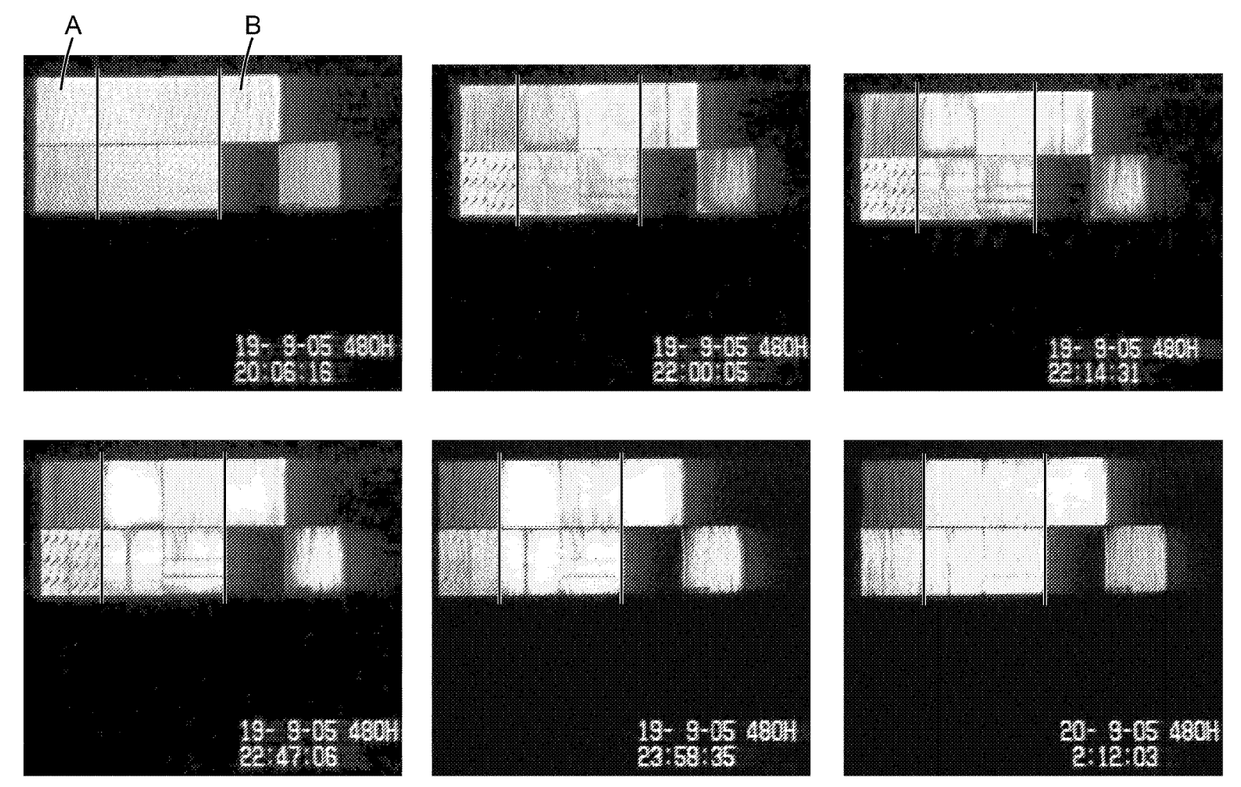
FIG. 1 represents photographs of an overnight anti-dew performance experiment performed on an outdoor test deck, while the different photographs have been taken at various moments in time.

FIG. 1 clearly shows that panel (A), which uses a coating assembly according to the present disclosure, provides and maintains overnight excellent retro-reflection upon light exposure under dew occurrence. In contrast, panel (B) tends to get darker and darker overnight under dew occurrence, which ultimately results in dramatic reduction of retro-reflection.

The invention claimed is:

1. A method for retarding dew formation on the surface of an article comprising a retro-reflective support, the method comprising:
   providing a substrate;
   applying a primer coating composition free of silica particles to the surface of the substrate, wherein the primer coating composition comprises a hydrophilic organofunctional silane and a multifunctional acrylic-based additive, wherein the hydrophilic organofunctional silane is 3-(acryloyloxy)propyl trimethyoxysilane, 3-(methacryloyloxy)propyl trimethoxysilane, or a combination thereof, wherein the multifunctional acrylic-based additive is trimethylolpropane trimethacrylate, wherein a weight ratio of the hydrophilic organofunctional silane to the trimethylolpropane trimethacrylate is 95:5 to 60:40;
   contacting at least part of the surface of said substrate with a silica nanoparticle coating composition comprising:
      an aqueous dispersion of a mixture of silica nanoparticles having an average particle diameter of 40 nanometers or less and silica nanoparticles having an average particle diameter greater than 40 nanometers, said aqueous dispersion having a pH of less than 5, and
      an acid having a pKa of less than 5;
   drying said coating composition so as to provide a silica nanoparticle coating onto said substrate, and thereby forming a coating assembly; and
   applying said coating assembly onto at least part of said retro-reflective support.

2. A method for retarding dew formation on the surface of an article comprising a retro-reflective support, the method comprising the steps of:
   providing a substrate;
   applying a primer coating composition free of silica particles to the surface of the substrate, wherein the primer coating composition comprises a hydrophilic organofunctional silane and a multifunctional acrylic-based additive, wherein the hydrophilic organofunctional silane is 3-(acryloyloxy)propyl trimethyoxysilane, 3-(methacryloyloxy)propyl trimethoxysilane, or a combination thereof, wherein the multifunctional acrylic-based additive is trimethylolpropane trimethacrylate, wherein a weight ratio of the hydrophilic organofunctional silane to the trimethylolpropane trimethacrylate is 95:5 to 60:40;
   contacting at least part of the surface of said substrate with a silica nanoparticle coating composition comprising:
      an aqueous dispersion of a mixture of acicular silica nanoparticles and spherical silica nanoparticles, said aqueous dispersion having a pH of less than 5, and
      an acid having a pKa of less than 5;
   drying said coating composition so as to provide a silica nanoparticle coating onto said substrate, and thereby forming a coating assembly; and
   applying said coating assembly onto at least part of said retro-reflective support.

3. A method for retarding dew formation on the surface of an article comprising a retro-reflective support, the method comprising the steps of:
   providing a substrate;
   applying a primer coating composition free of silica particles to the surface of the substrate, wherein the primer coating composition comprises a hydrophilic organofunctional silane and a multifunctional acrylic-based additive, wherein the hydrophilic organofunctional silane is 3-(acryloyloxy)propyl trimethyoxysilane, 3-(methacryloyloxy)propyl trimethoxysilane, or a combination thereof, wherein the multifunctional acrylic-based additive is trimethylolpropane trimethacrylate, wherein a weight ratio of the hydrophilic organofunctional silane to the trimethylolpropane trimethacrylate is 95:5 to 60:40;

contacting at least part of the surface of said substrate with a silica nanoparticle coating composition comprising:
  an aqueous dispersion of core-shell particles, each core-shell particle comprising a polymer core surrounded by a shell consisting essentially of silica nanoparticles disposed on said polymer core, said aqueous dispersion having a pH of less than 5, and
an acid having a pKa of less than 5;
drying said coating composition so as to provide a silica nanoparticle coating onto said substrate, and thereby forming a coating assembly; and
applying said coating assembly onto at least part of said retro-reflective support.

4. A method according to claim 3, wherein the substrate comprises a material selected from the group consisting of polymeric materials, glass, ceramic, organic and inorganic composite material, metal, and any mixtures or combinations thereof.

5. A method according to claim 4, wherein the substrate comprises an organic polymeric material that is a poly(meth) acrylate, polyurethane, polyester, polycarbonate, polyolefin, polymethylmethacrylate, or any combination or mixture thereof.

6. The method according to claim 3, wherein the substrate comprises a material that is transparent or translucent to visible light.

7. The method according to claim 3, wherein the silica nanoparticles are free of surface modification or free of surface functionalization.

8. The method according to claim 3, wherein the acid is nitric acid, wherein the aqueous dispersion has a pH of less than 3.

9. The method according to claim 3, wherein the weight ratio of the hydrophilic organofunctional silane to the trimethylolpropane trimethacrylate is 90:10 to 80:20.

10. The method according to claim 3, wherein the dried silica nanoparticle coating composition has a thickness of 500 angstroms to 2500 angstroms.

11. The method according to claim 3, wherein the primer coating composition further comprises tetraethoxysilane.

12. The method according to claim 11, wherein the hydrophilic organofunctional silane is 3-(acryloyloxy)propyl trimethoxysilane, wherein the weight ratio of the 3-(acryloyloxy)propyl trimethoxysilane and the trimethylolpropane trimethacrylate is 98:2 to 80:20.

13. The method according to claim 12, wherein the weight ratio of the 3-(acryloyloxy)propyl trimethoxysilane and the trimethylolpropane trimethacrylate is 96:4 to 92:8.

* * * * *